United States Patent
Araie et al.

(10) Patent No.: US 11,806,786 B2
(45) Date of Patent: Nov. 7, 2023

(54) METHOD OF ADDITIVE MANUFACTURING

(71) Applicant: Sodick Co., Ltd., Kanagawa (JP)

(72) Inventors: Ichiro Araie, Kanagawa (JP); Toshio Kaji, Kanagawa (JP); Tatsuro Hayakawa, Kanagawa (JP); Hiroshi Amioka, Kanagawa (JP); Atsushi Hirota, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 17/832,690

(22) Filed: Jun. 6, 2022

(65) Prior Publication Data
US 2022/0395908 A1 Dec. 15, 2022

(30) Foreign Application Priority Data

Jun. 10, 2021 (JP) ................... 2021-097282

(51) Int. Cl.
*B22F 12/67* (2021.01)
*B22F 10/28* (2021.01)
(Continued)

(52) U.S. Cl.
CPC .............. *B22F 12/67* (2021.01); *B22F 10/28* (2021.01); *B22F 12/30* (2021.01); *B22F 12/41* (2021.01);
(Continued)

(58) Field of Classification Search
None
See application file for complete search history.

(56) References Cited

U.S. PATENT DOCUMENTS

| | | | | |
|---|---|---|---|---|
| 2013/0264750 A1* | 10/2013 | Hofacker | ............. | B22F 12/226 425/174 |
| 2016/0089821 A1* | 3/2016 | Atkins | ..................... | B22F 5/00 249/111 |

(Continued)

FOREIGN PATENT DOCUMENTS

| | | | | |
|---|---|---|---|---|
| JP | 2008221801 | | 9/2008 | |
| WO | WO-2020019404 A1 * | | 1/2020 | ............. B22F 10/00 |

OTHER PUBLICATIONS

Yang, Xiaobin, and Shan-Tung Tu. "The Effect of a Constraining Metal Tube on Flux Pinning Induced Stress in a Long Cylindrical Superconductor." Journal of Applied Physics, vol. 112, No. 2, 2012, p. 023909 (Year: 2012).*

(Continued)

*Primary Examiner* — Keith Walker
*Assistant Examiner* — Ryan L Heckman
(74) *Attorney, Agent, or Firm* — JCIPRNET

(57) ABSTRACT

A stress controlled layer is constituted to include a compressive stress applied part that is a region to which a compressive stress is applied and a compressive stress non-applied part that is a region different from the compressive stress applied part. In a solidifying step, scanning of a laser beam or an electron beam is performed while a scanning direction for the compressive stress applied part is different from a scanning direction for the compressive stress non-applied part such that the compressive stress applied part expands further than the compressive stress non-applied part or the compressive stress non-applied part shrinks compared with the compressive stress applied part based on a relationship between the scanning direction and an expansion quantity or a shrinkage quantity at a time of temperature change or at a time of heat treatment.

18 Claims, 30 Drawing Sheets

(51) Int. Cl.
  *B22F 12/41*    (2021.01)
  *B22F 12/30*    (2021.01)
  *B22F 12/49*    (2021.01)
  *B33Y 10/00*    (2015.01)
  *B33Y 30/00*    (2015.01)

(52) U.S. Cl.
  CPC .......... *B22F 12/49* (2021.01); *B22F 2998/10* (2013.01); *B33Y 10/00* (2014.12); *B33Y 30/00* (2014.12)

(56) References Cited

U.S. PATENT DOCUMENTS

2017/0066052 A1\* 3/2017 Abe .................. B22F 10/366
2021/0170487 A1\* 6/2021 Liu .................... B22F 10/36

OTHER PUBLICATIONS

Machine Translation of WO-2020019404-A1 (Year: 2020).\*

\* cited by examiner

METHOD OF ADDITIVE MANUFACTURING

CROSS-REFERENCE TO RELATED APPLICATIONS

This application claims the priority benefit of Japan Patent Application No. 2021-097282, filed on Jun. 10, 2021. The entirety of the above-mentioned patent application is hereby incorporated by reference herein and made a part of this specification.

BACKGROUND

Technical Field

The disclosure relates to a method of additive manufacturing.

Description of Related Art

Various methods are known as a method of additive manufacturing of a three-dimensional object. For example, an additive manufacturing apparatus performing powder bed fusion forms a material layer made of a material powder in a build region and forms a solidified layer by sintering or melting of the material layer by scanning a laser beam or an electron beam and irradiating a predetermined position in the material layer with a laser beam or an electron beam. Further, the additive manufacturing apparatus produces a desired three-dimensional object by repeating formation of the material layers and the solidified layers and laminating the solidified layers.

Additive manufacturing is utilized for producing various three-dimensional objects. For example, it is difficult to produce an object internally having a complicated space through cutting working or electric discharge machining, but additive manufacturing is suitable for producing such an object.

Japanese Patent Laid-Open No. 2008-221801 discloses a method of producing a mold component internally having a flow channel allowing a cooling medium to circulate therethrough by additive manufacturing.

Welding or cold working such as press working or bending working may be performed with respect to a three-dimensional object, and a residual stress may be generated in the three-dimensional object at this time. In addition, an external stress may be applied to a three-dimensional object at a stage of using it. Such a residual stress or an external stress acts as a tensile stress. Cracking may occur when a tensile stress is locally applied to a three-dimensional object. For example, when a three-dimensional object is a mold component internally having a flow channel, a tensile stress may be generated in a direction in which the flow channel widens because of a pressure of a circulating cooling medium, and cracking may occur on an inner surface of the flow channel or in the vicinity of the flow channel.

Here, the applicant has found that an expansion quantity or a shrinkage quantity of a solidified layer increases or decreases in accordance with a scanning direction of a laser beam or an electron beam. It has become clear that a difference occurs in the expansion quantity or the shrinkage quantity during transformation or age hardening; or the expansion quantity or the shrinkage quantity at the time of temperature change because of variance in the scanning direction. If the expansion quantity or the shrinkage quantity is controlled, a compressive stress can be applied to a desired location in a solidified layer.

The disclosure has been made in consideration of such circumstances and provides a method of additive manufacturing in which occurrence of cracking in a three-dimensional object can be curbed.

SUMMARY

According to the disclosure, there is provided a method of additive manufacturing including a material layer forming step of forming a material layer in a build region that is a region for forming a desired three-dimensional object, and a solidifying step of forming a solidified layer by irradiating an irradiation region of the material layer with a laser beam or an electron beam through scanning performed with the laser beam or the electron beam in a predetermined scanning direction. The three-dimensional object is produced by laminating a plurality of solidified layers through repetition of the material layer forming step and the solidifying step for each of divided layers formed by dividing the three-dimensional object by a predetermined thickness. A stress controlled layer, which is one or more solidified layers of the plurality of solidified layers, is constituted to include a compressive stress applied part that is a region to which a compressive stress is applied and a compressive stress non-applied part that is a region different from the compressive stress applied part. In the solidifying step, scanning of the laser beam or the electron beam is performed while the scanning direction for the compressive stress applied part is different from the scanning direction for the compressive stress non-applied part such that the compressive stress applied part expands further than the compressive stress non-applied part or the compressive stress non-applied part shrinks compared with the compressive stress applied part based on a relationship between the scanning direction and an expansion quantity or a shrinkage quantity at a time of temperature change or at a time of heat treatment.

BRIEF DESCRIPTION OF THE DRAWINGS

In the method of additive manufacturing according to the disclosure, in the solidifying step, scanning is performed with a laser beam or an electron beam with respect to the compressive stress applied part in the scanning direction different from the scanning direction of the compressive stress non-applied part such that a compressive stress is applied to the compressive stress applied part based on the relationship between the scanning direction and the expansion quantity or the shrinkage quantity. According to such a constitution, even if a tensile stress is applied to the compressive stress applied part of a three-dimensional object, at least a part of the tensile stress is reduced by a compressive stress that is a residual stress of the compressive stress applied part, and thus cracking is unlikely to occur in the compressive stress applied part.

DESCRIPTION OF THE EMBODIMENT

Hereinafter, an embodiment of the disclosure will be described with reference to the drawings. Feature matters described below in the embodiment can be combined together. In addition, the disclosure is independently established regarding each of the feature matters.

Figure 1:
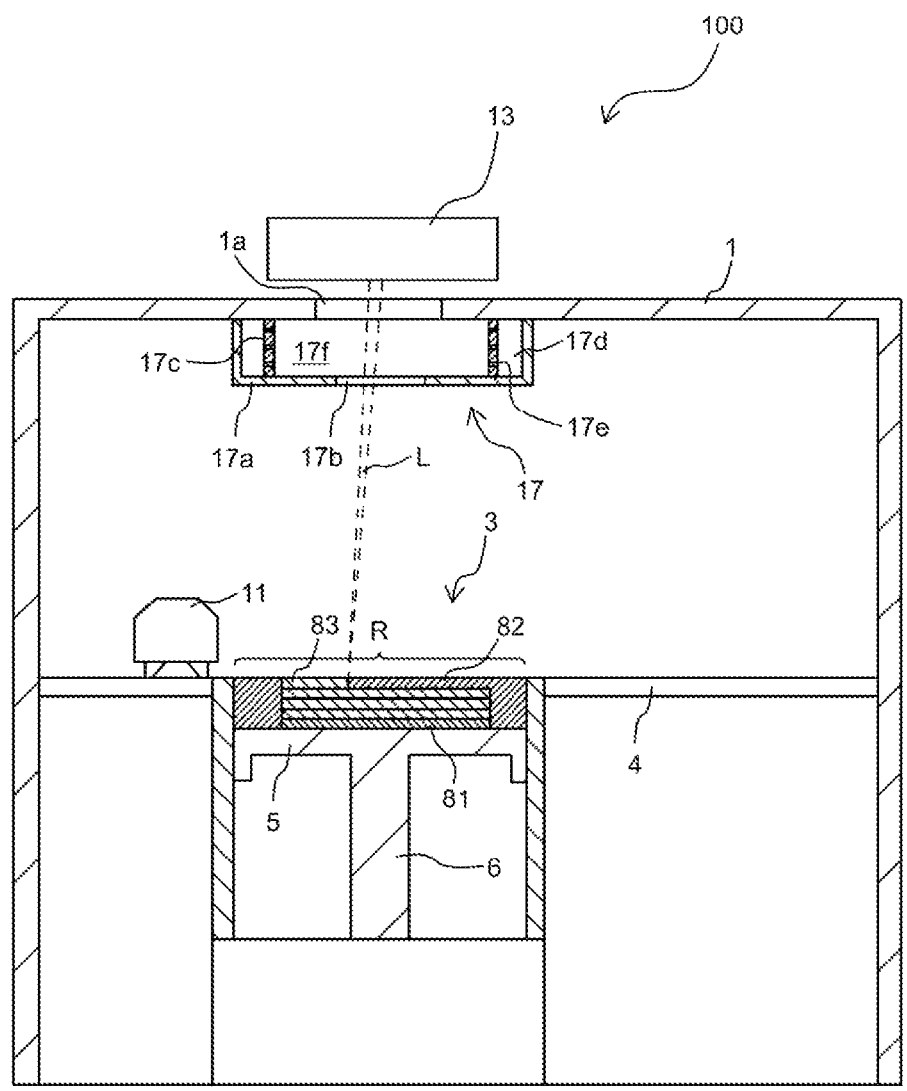
FIG. 1 is a view of a schematic constitution of an additive manufacturing apparatus 100.

An additive manufacturing apparatus 100 of the present embodiment is an apparatus for performing powder bed fusion. Specifically, the additive manufacturing apparatus 100 forms a three-dimensional object through repetition of formation of a material layer 82 and formation of a solidified layer 83 for each of divided layers formed by dividing a desired three-dimensional object by a predetermined thickness. As illustrated in FIG. 1, the additive manufacturing apparatus 100 includes a chamber 1, a material layer forming device 3, and an irradiation device 13.

The chamber 1 covers a necessary build region R that is a region in which a desired three-dimensional object is formed. An inert gas having a predetermined concentration is supplied to the chamber 1 from an inert gas supply device, and an inert gas containing fumes generated during formation of the solidified layer is discharged from the chamber 1. For example, the inert gas supply device is an inert gas generator generating the inert gas having the predetermined concentration from ambient air or a gas cylinder storing the inert gas having the predetermined concentration. Preferably, fumes are removed by a fume collector from the inert gas discharged from the chamber 1, and the inert gas is returned to the chamber 1. For example, the fume collector is an electrostatic precipitator or a filter. In this specification, an inert gas is a gas which does not practically react with the material layer 82 and the solidified layer 83, and an appropriate gas is selected from a nitrogen gas, an argon gas, a helium gas, or the like in accordance with the kind of a material.

When the irradiation device 13 is a device performing irradiation with a laser beam L, an upper surface of the chamber 1 is provided with a window 1a through which the laser beam L is transmitted. The window 1a is formed of a material allowing the laser beam L to be transmitted therethrough. Specifically, the material of the window 1a is selected from quartz glass and borosilicate glass; crystals of germanium, silicon, zinc selenium, and potassium bromide; and the like in accordance with the kind of the laser beam L. For example, when the laser beam L is a fiber laser or a YAG laser, the window 1a can be constituted using quartz glass.

The upper surface of the chamber 1 is provided with a contamination prevention device 17 covering the window 1a. The contamination prevention device 17 includes a cylindrical casing 17a and a cylindrical diffusion member 17c disposed inside the casing 17a. An inert gas supply space 17d is provided between the casing 17a and the diffusion member 17c. On a bottom surface of the casing 17a, an opening part 17b is provided on an inward side of the diffusion member 17c. A number of pores 17e are provided in the diffusion member 17c, and a clean room 17f is filled with a clean inert gas supplied to the inert gas supply space 17d through the pores 17e. Further, the clean inert gas which has filled the clean room 17f is spouted to a side below the contamination prevention device 17 through the opening part 17b. According to such a constitution, fumes are prevented from adhering to the window 1a, and fumes are eliminated from an irradiation path of the laser beam L.

Figure 2:
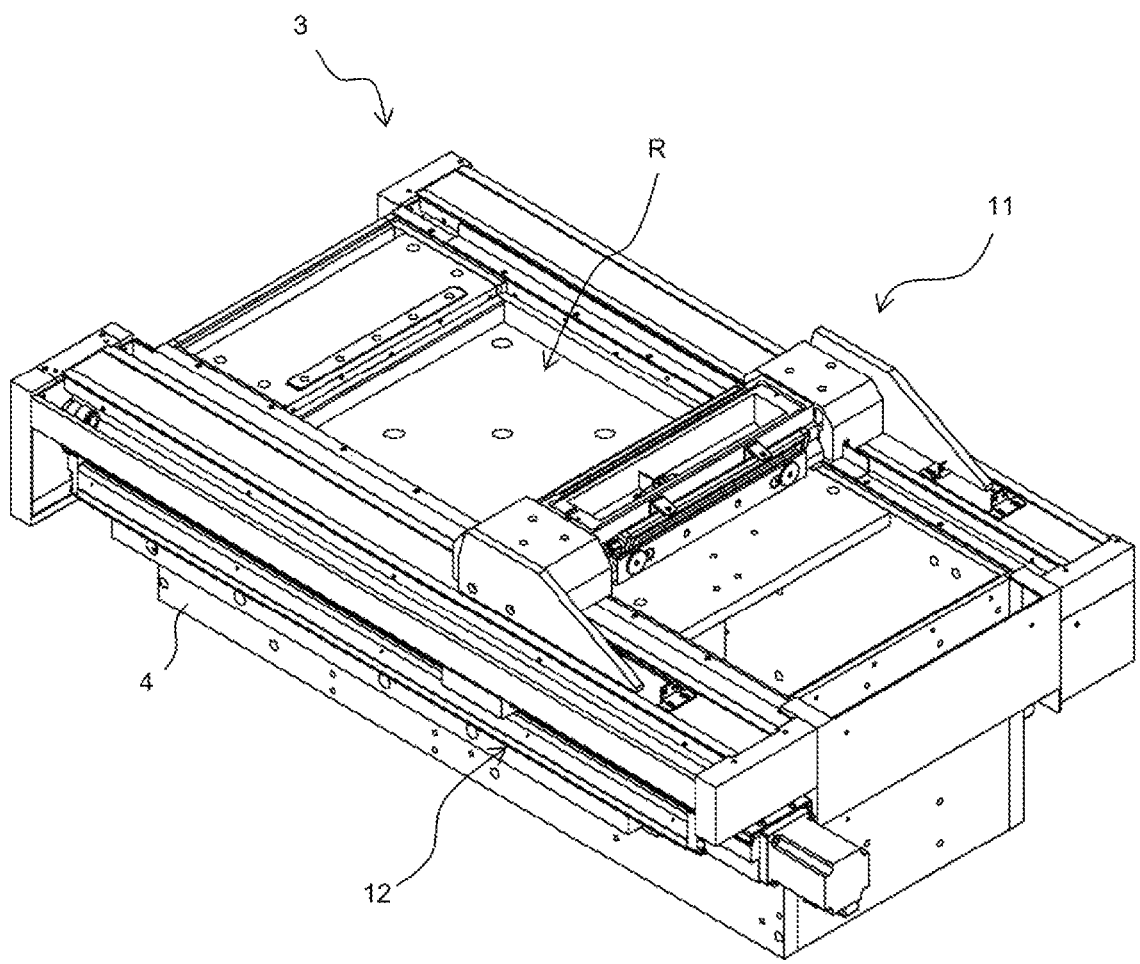
FIG. 2 is a perspective view of a material layer forming device 3.

The material layer forming device 3 is provided inside the chamber 1. As illustrated in FIG. 2, the material layer forming device 3 includes a base 4 having the build region R, and a recoater head 11 disposed on the base 4. The recoater head 11 is constituted such that it can be reciprocated in a horizontal direction by a recoater head driving device 12.

Figure 3:
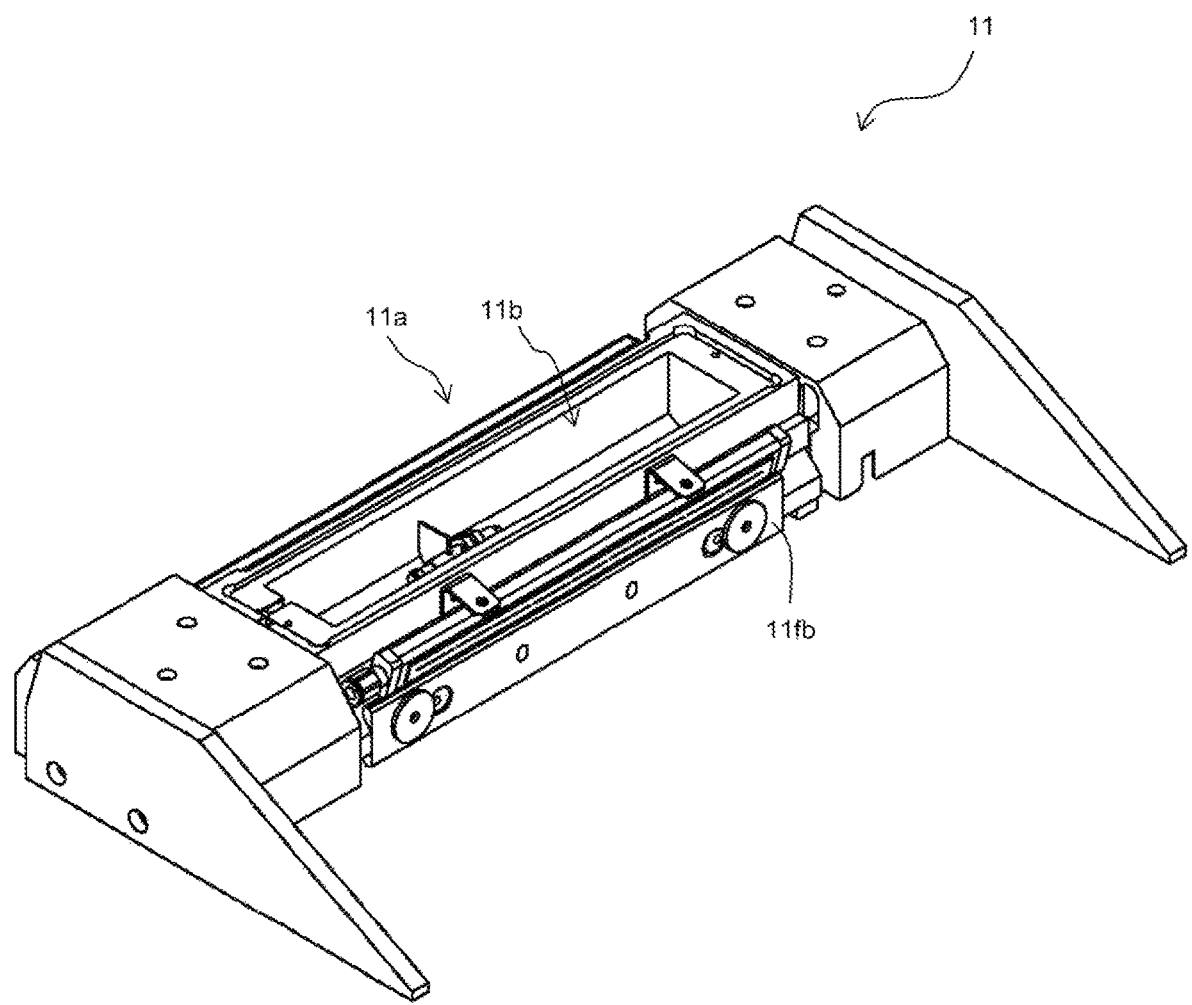
FIG. 3 is a perspective view of a recoater head 11 viewed from above.
Figure 4:
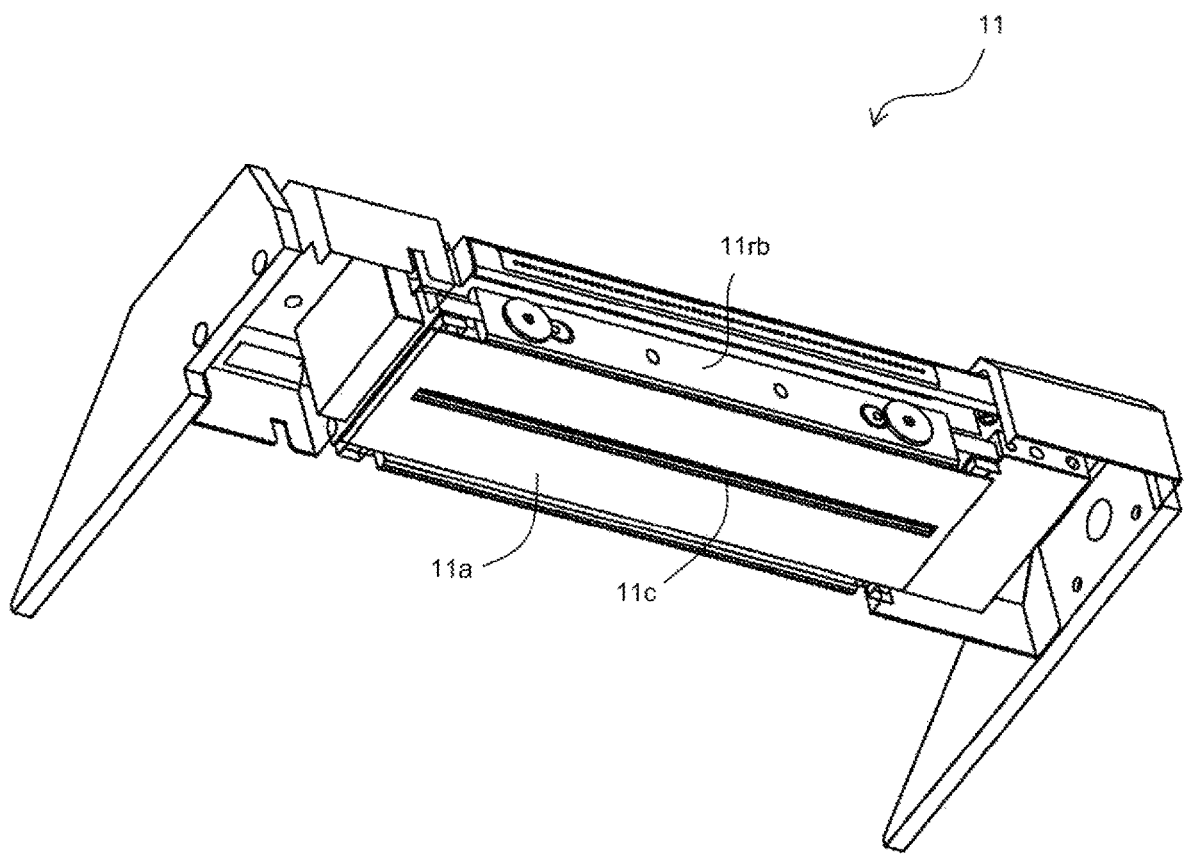
FIG. 4 is a perspective view of the recoater head 11 viewed from below.

As illustrated in FIGS. 3 and 4, the recoater head 11 includes a material container 11a, a material supply port 11b, and a material discharge port 11c. In the present embodiment, a metal material powder is used as a material for forming the material layer 82. If the material can be used for additive manufacturing and is a substance causing anisotropy in the expansion quantity or the shrinkage quantity in accordance with a scanning direction of the laser beam L or an electron beam, it can be used as the material.

The material supply port 11b is provided on an upper surface of the material container 11a and serves as a reception port for a material powder supplied from a material supply unit to the material container 11a. The material discharge port 11c is provided on a bottom surface of the material container 11a, and a material powder inside the material container 11a is discharged through the material discharge port 11c. The material discharge port 11c has a slit shape extending in a longitudinal direction of the material container 11a. Blades 11fb and 11rb are provided on both side surfaces of the recoater head 11. The blades 11fb and 11rb flatten the material powder discharged from the material discharge port 11c and form the material layer 82. The blades 11fb and 11rb may have a flat plate shape or may have a brush shape.

As illustrated in FIGS. 1 and 2, the build region R is positioned on a build table 5, and a desired three-dimensional object is formed in the build region R. The build table 5 is driven by a build table driving device 6 and can move in a vertical direction. At the time of manufacturing, a base plate 81 may be disposed on the build table 5, and the material layer 82 as a first layer may be formed on the base plate 81.

Figure 5:
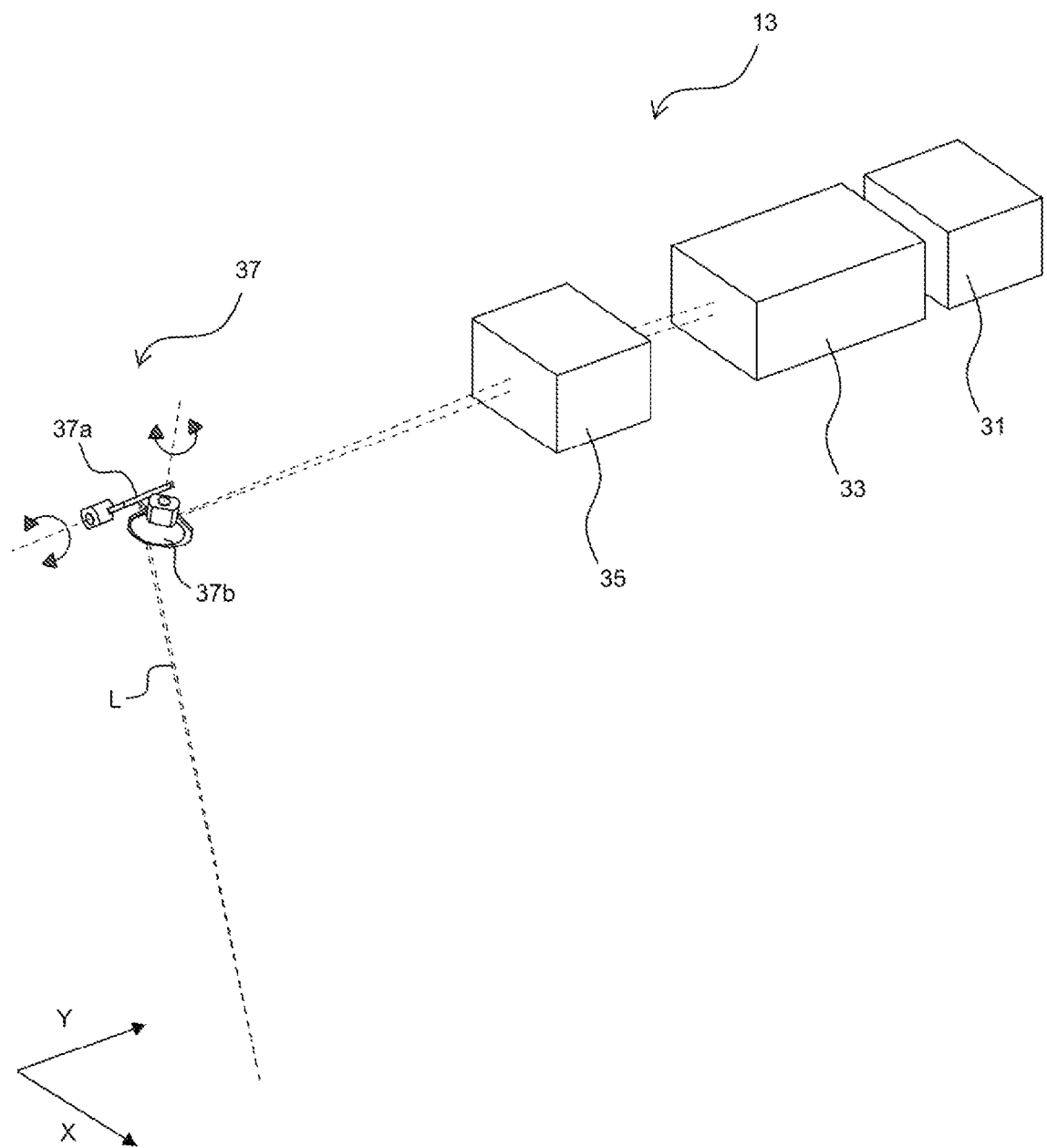
FIG. 5 is a view of a schematic constitution of an irradiation device 13.

As illustrated in FIG. 1, the irradiation device 13 is provided above the chamber 1. The irradiation device 13 performs melting or sintering of a material powder at an irradiation position and solidifies it by irradiating an irradiation region of the material layer 82 formed within the build region R with the laser beam L in accordance with irradiation conditions set in advance. The irradiation conditions include an intensity, a size of a spot diameter, a scanning speed of the laser beam L or the electron beam, thicknesses of the divided layers. The irradiation region is present within the build region R and almost coincides with a region surrounded by a contour shape of the three-dimensional object in a predetermined divided layer. As illustrated in FIG. 5, the irradiation device 13 includes a light source 31, a collimator 33, a focus control unit 35, and a scanner 37.

The light source 31 generates the laser beam L. The laser beam L need only be able to perform sintering or melting of a material powder and is a fiber laser, a $CO_2$ laser, or a YAG laser, for example. In the present embodiment, a fiber laser is used as the laser beam L.

The collimator 33 includes a collimator lens. The collimator 33 converts the laser beam L output from the light source 31 into parallel light. The focus control unit 35 includes a focus control lens, and a motor which moves the focus control lens forward and rearward in an optical axis direction. The focus control unit 35 adjusts a beam diameter, that is, a spot diameter of the laser beam L on a surface of the material layer 82 by adjusting a focal position of the laser beam L which has been converted into parallel light by the collimator 33.

For example, the scanner 37 is a Galvano scanner and includes an X axis Galvano mirror 37a and a Y axis Galvano mirror 37b, and an X axis actuator and a Y axis actuator individually rotating the X axis Galvano mirror 37a and the Y axis Galvano mirror 37b to desired angles. The laser beam L which has passed through the focus control unit 35 is used for two-dimensional scanning on the surface of the material layer 82 within the build region R by the X axis Galvano mirror 37a and the Y axis Galvano mirror 37b. Specifically, the laser beam L is reflected by the X axis Galvano mirror 37a to be scanned in an X axis direction of the build region R, and the laser beam L is reflected by the Y axis Galvano mirror 37b to be scanned in a Y axis direction of the build region R. Here, the X axis direction and the Y axis direction are horizontal directions orthogonal to each other.

Rotation angles of the X axis Galvano mirror 37a and the Y axis Galvano mirror 37b are individually controlled by means of drive currents input to the X axis actuator and the Y axis actuator. Accordingly, a desired position within the build region R can be irradiated with the laser beam L. The laser beam L reflected by the X axis Galvano mirror 37a and the Y axis Galvano mirror 37b is transmitted through the window 1a and is used for irradiating the material layer 82 within the build region R. Accordingly, the solidified layer 83 is formed. The irradiation device 13 is not limited to the embodiment described above. For example, an fθ lens may be provided in place of the focus control unit 35. In addition, the irradiation device may be constituted to solidify the material layer 82 by performing irradiation with the electron beam in place of the laser beam L. Specifically, the irradiation device may be constituted to include a cathode electrode emitting electrons, an anode electrode converging and accelerating electrons, a solenoid converging directions of electron beams into one direction by forming a magnetic field, and a collector electrode electrically connected to the material layer 82 that is an irradiation target. A voltage is applied between the cathode electrode and the collector electrode.

A controller of the additive manufacturing apparatus 100 performs additive manufacturing by controlling the material layer forming device 3, the irradiation device 13, and the like in accordance with a project file. For example, a project file is made by a computer aided manufacturing (CAM) device and is sent to the controller via a communication line or a storage medium. The controller and the CAM device are constituted by optionally combining hardware such as a central processing unit (CPU), a random access memory (RAM), a read only memory (ROM), an auxiliary storage device, and an output/input interface with software. The project file may include commands for scanning patterns of the laser beam L or an electron beam. In other words, in the present embodiment, the CAM device determines the scanning pattern.

A method of additive manufacturing according to the disclosure can be applied to production of various three-dimensional objects. Particularly, it is favorably applied to production of a three-dimensional object internally having a flow channel allowing a fluid such as a cooling medium to circulate therethrough. Examples of such a three-dimensional object include a mold component constituting at least a part of a mold.

Figure 6:
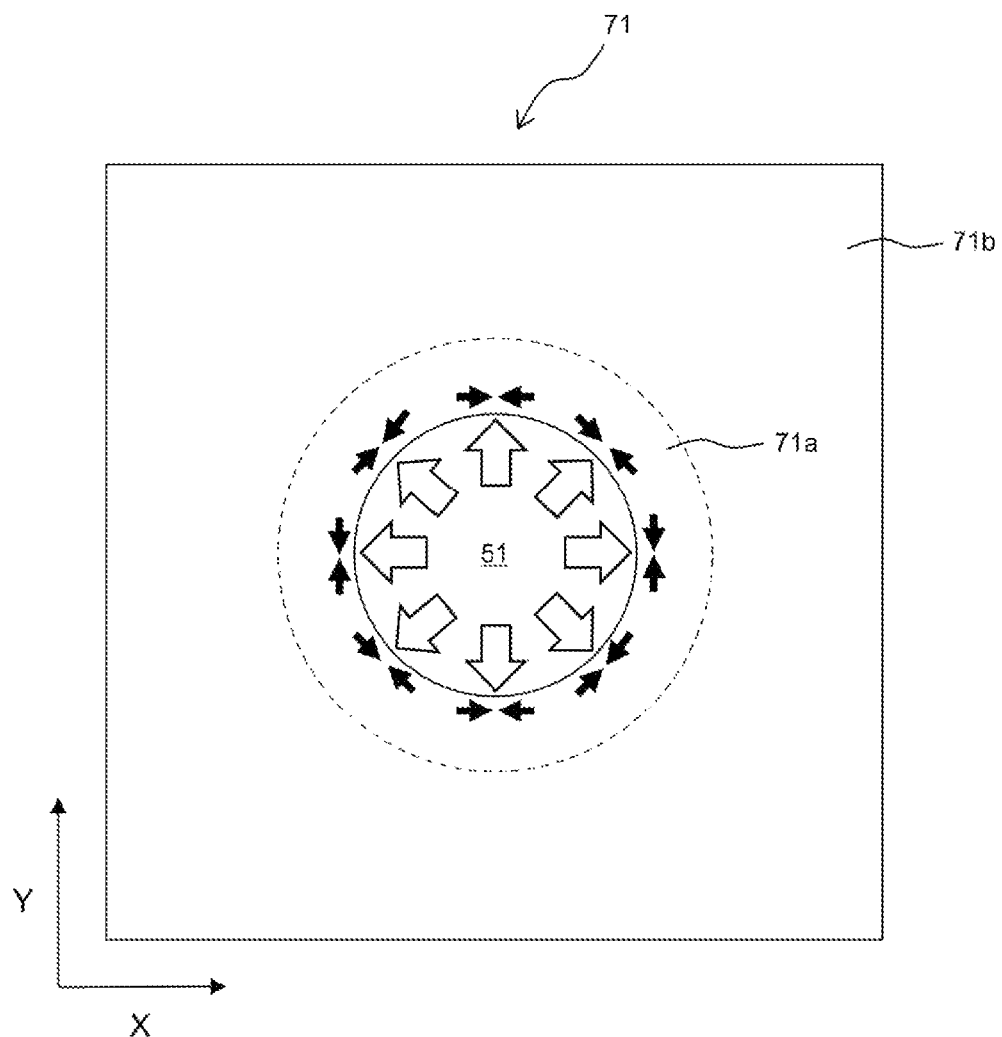
FIG. 6 is a partial cross-sectional view including a transverse section of a flow channel 51 of a three-dimensional object 71.

FIG. 6 is a cross-sectional view of an example of a three-dimensional object 71 in which cracking is likely to occur and illustrates one predetermined layer of a plurality of solidified layers 83 constituting the three-dimensional object 71. In the case of the three-dimensional object 71 internally provided with a flow channel 51 having such a circular cross section, if a fluid circulates through the flow channel 51, a tensile stress is generated in a direction in which the flow channel 51 widens because of a pressure of the fluid. For example, such a tensile stress acts as a cause of stress corrosion cracking, and thus cracking is likely to occur on an inner surface of the flow channel 51 or in the vicinity of the flow channel 51. Meanwhile, when a compressive stress in a direction along a circumferential edge of a circular cross section in the flow channel 51 is applied in advance to such a portion in which cracking is likely to occur, even if the tensile stress is applied to the portion, at least a part thereof is reduced by the compressive stress that is a residual stress, and thus cracking is unlikely to occur. In FIG. 6, a tensile pressure which may be applied to the three-dimensional object 71 is schematically indicated by the white arrow, and the compressive stress which may reduce a tensile pressure is schematically indicated by the black arrow.

Regarding a method of applying the compressive stress to a portion in which cracking is likely to occur, it is conceivable that the expansion quantity or the shrinkage quantity of the solidified layer 83 constituting the three-dimensional object 71 be controlled. Normally, the solidified layer 83 formed by irradiating the material layer 82 with the laser beam L or the electron beam is cooled and shrinks. In addition, when heat treatment is performed during manufacturing or after manufacturing, the solidified layer 83 may expand or shrink in accordance with the heat treatment. For example, when quenching treatment is performed as heat treatment during manufacturing or after manufacturing and martensitic transformation is caused in the solidified layer 83, the solidified layer 83 expands. In addition, martensitic transformation may also occur because of natural cooling after manufacturing. Such expansion due to martensitic transformation occurs particularly significantly when a material having a martensitic structure at a normal temperature such as a martensitic stainless steel (e.g., SUS 420J2). In addition, when age hardening processing is performed as heat treatment after manufacturing for age hardening of the solidified layer 83, the solidified layer 83 shrinks. Such shrinkage due to age hardening occurs particularly significantly when a precipitation hardening stainless steel (e.g., SUS 630 or SUS 631), a maraging steel (including a steel material corresponding to a maraging steel), or the like is used as a material.

In the present embodiment, occurrence of cracking is curbed by intentionally applying the compressive stress to a part of the solidified layer 83. Here, the solidified layer(s) 83 of the plurality of solidified layers 83 constituting the three-dimensional object 71, to which the compressive stress is intentionally applied will be referred to as a stress controlled layer. The stress controlled layer is constituted to include the compressive stress applied part 71a that is a region to which the compressive stress is applied, and the compressive stress non-applied part 71b that is a region different from the compressive stress applied part 71a. In a predetermined solidified layer 83 illustrated in FIG. 6, the compressive stress applied part 71a is a portion adjacent to the inner surface of the flow channel 51 and surrounding the flow channel 51, and the compressive stress non-applied part 71b is a portion adjacent to the compressive stress applied part 71a and surrounding the compressive stress applied part 71a. The compressive stress can remain in the compressive stress applied part 71a by generating a difference between the expansion quantities or the shrinkage quantities of the compressive stress applied part 71a and the compressive stress non-applied part 71b. Specifically, in a direction along the circumferential edge of a circular cross section in the flow channel 51, the expansion quantity of the compressive stress applied part 71a is caused to be larger than the expansion quantity of the compressive stress non-applied part 71b, or the shrinkage quantity of the compressive stress applied part 71a is caused to be smaller than the shrinkage quantity of the compressive stress non-applied part 71b. Accordingly, the compressive stress applied part 71a relatively expands with respect to the compressive stress non-applied part 71b. As a result, the compressive stress remains in the compressive stress applied part 71a.

Therefore, the compressive stress can be applied to the compressive stress applied part 71a, and thus cracking can be curbed by controlling structure characteristics of the solidified layer 83 such that the relationship described above is realized between the expansion quantities or the shrinkage quantities of the compressive stress applied part 71a and the compressive stress non-applied part 71b. A specific example of a scanning pattern for applying the compressive stress will be described below.

Figure 7:
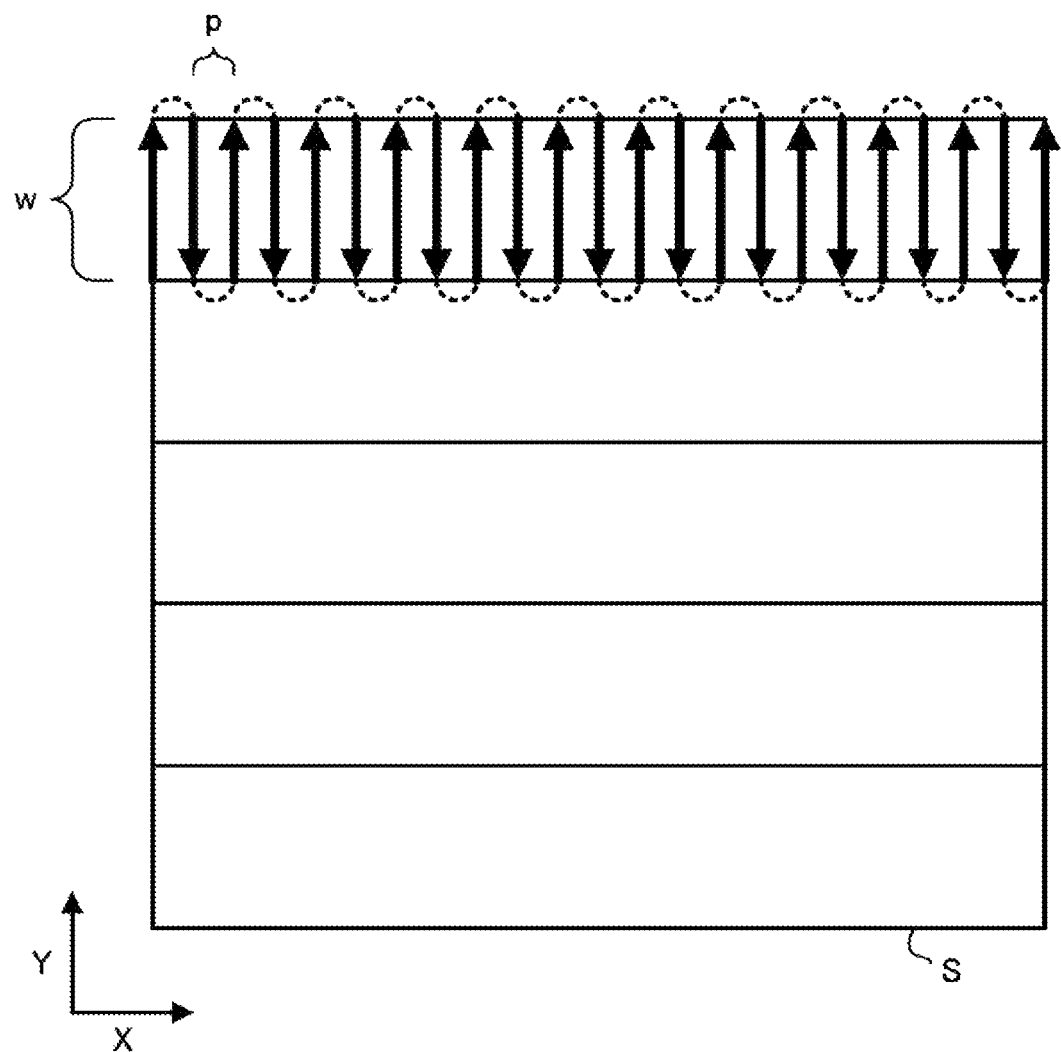
FIG. 7 illustrates a scanning line in raster scanning.

Here, raster scanning of the laser beam L or the electron beam will be described. FIG. 7 illustrates an exemplary irradiation region S. First, the irradiation region S is divided into divided regions by a predetermined width w. Further, a scanning line is set within the divided regions by a predetermined pitch p. In FIG. 7, the arrows indicate scanning paths of the laser beam L or the electron beam in one divided region. The solid line portions indicate positions to be irradiated with the laser beam L or the electron beam and the dotted line portions indicate positions where irradiation with the laser beam L or the electron beam is temporarily stopped, respectively. While scanning with the laser beam L or the electron beam is repeated along the scanning line, scanning proceeds toward a direction orthogonal to the scanning line. Such scanning is performed with the laser beam L or the electron beam for each of the divided regions, and therefore the solidified layer 83 is formed. Such scanning paths are merely an example. For example, in order to curb an influence of heat at the time of irradiation with the laser beam L or the electron beam, the scanning paths may be set such that a predetermined scanning line and a scanning line for succeeding scanning are not adjacent to each other. Hereinafter, a direction along the scanning line will be referred to as a scanning direction. In addition, the scanning direction can be indicated by an angle with respect to a predetermined horizontal direction. Hereinafter, unless otherwise specified, the scanning direction is indicated by an angle with respect to the X axis direction. In FIG. 7, the scanning direction is 90°. In this specification, the scanning direction is indicated by an angle within a range of 0° to 180°. Regarding a scanning direction exceeding 180°, a value obtained by subtracting 180° from the value is regarded as the scanning direction. That is, when $\theta 1=\theta 2-180°$ is satisfied, a scanning direction $\theta 1$ ($0°\leq\theta 1<180°$) and a scanning direction $\theta 2$ ($180°\leq\theta 2<360°$) are handled as the same scanning directions. Specifically, in this specification, the scanning directions at 0°, 45°, 90°, and 135° may be substituted by the scanning directions at 180°, 225°, 270°, and 315°, respectively.

In addition, the scanning direction in raster scanning may be set such that it differs for each of the divided layers. For example, in scanning related to the divided layers of odd numbered layers and scanning related to the divided layers of even numbered layers, the scanning directions thereof may be set such that they differ from each other by 90°. In this way, compared to a case in which the scanning directions are set as one direction, uniformity of a three-dimensional object in its entirety can be maintained, and manufacturing can be performed while distortion is curbed.

Figure 8A:
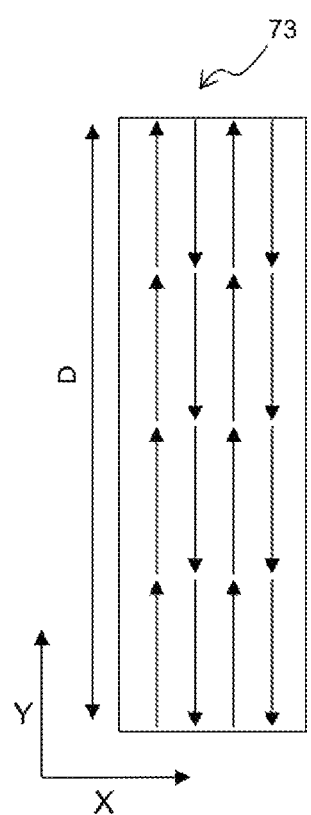
FIG. 8A illustrates a scanning pattern A with respect to a three-dimensional object 73.
Figure 8B:
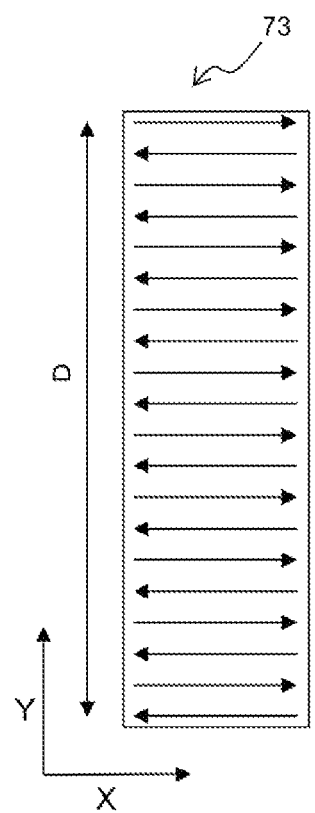
FIG. 8B illustrates a scanning pattern B with respect to the three-dimensional object 73.
Figure 8C:
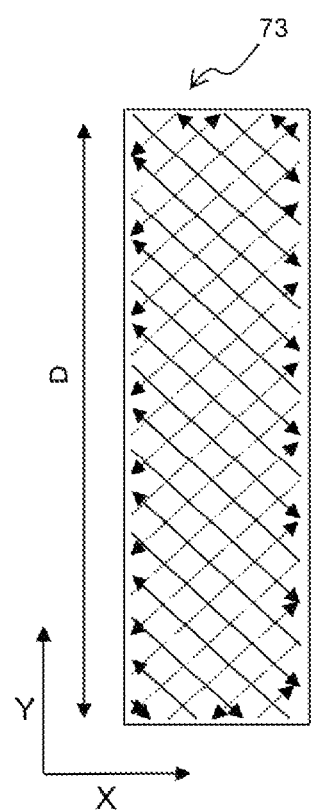
FIG. 8C illustrates a scanning pattern C with respect to the three-dimensional object 73.

The applicant has found that the expansion quantity or the shrinkage quantity at the time of temperature change or at the time of heat treatment of the solidified layer 83 increases or decreases in accordance with the scanning direction of the laser beam L or the electron beam. FIGS. 8A to 8C illustrate scanning patterns of the laser beam L or the electron beam used in experiments. A rectangular parallelepiped three-dimensional object 73 was subjected to additive manufacturing by scanning patterns A, B, and C having scanning directions different from each other, and the expansion quantity or the shrinkage quantity in a longitudinal direction D due to temperature change or heat treatment was measured. The longitudinal direction D is a longitudinal direction of the three-dimensional object 73 in a plan view. FIGS. 8A to 8C schematically illustrate plan views of the three-dimensional object 73 and the scanning directions. At the time of manufacturing, the longitudinal direction D is a direction extending in the Y axis direction.

In the pattern A illustrated in FIG. 8A, scanning was performed in a direction parallel to the longitudinal direction D. At this time, the scanning direction was 90°. In the pattern B illustrated in FIG. 8B, scanning was performed in a direction perpendicular to the longitudinal direction D. At this time, the scanning direction was 0°. In the pattern C illustrated in FIG. 8C, scanning was alternately performed in a direction at +45° or −45° with respect to the longitudinal direction D for each of the divided layers. That is, scanning was performed for the divided layers of the odd numbered layers in the scanning direction at 45°, and scanning was performed for the divided layers of the even numbered layers in the scanning direction at 135°.

When a material whose thermal expansion coefficient varies in accordance with the scanning direction is used, regarding a linear expansion coefficient of the three-dimensional object 73 in the longitudinal direction D, a relationship of either Expression (1) or Expression (2) is established based on the kind of the material and the irradiation conditions.

$$\alpha_{90} < \alpha_{45} < \alpha_0 \quad (1)$$

$$\alpha_{90} > \alpha_{45} > \alpha_0 \quad (2)$$

Here, $\alpha_{90}$ indicates a linear expansion coefficient [K$^{-1}$] of the three-dimensional object 73 formed by performing scanning with the pattern A, $\alpha_0$ indicates a linear expansion coefficient [K$^{-1}$] of the three-dimensional object 73 formed by performing scanning with the pattern B, and $\alpha_{45}$ indicates a linear expansion coefficient [K$^{-1}$] of the three-dimensional object 73 formed by performing scanning with the pattern C. For example, when a maraging steel is used as a material under predetermined irradiation conditions, the relationship of Expression (2) is established. In addition, under the predetermined irradiation conditions, when a steel material corresponding to a maraging steel containing no cobalt (so-called cobalt-free maraging steel) is used as a material, the relationship of Expression (1) is established. Namely, when a material whose thermal expansion coefficient varies in accordance with the scanning direction is used, regarding the shrinkage quantity of the three-dimensional object 73 at the time of cooling, based on the kind of the material or the irradiation conditions, there are a case in which the shrinkage quantity in a direction parallel to the scanning direction is smaller than the shrinkage quantity in a direction perpendicular to the scanning direction (that is, a case in which Expression (1) is established regarding the linear expansion coefficient) and a case in which the shrinkage quantity in a direction parallel to the scanning direction is larger than the shrinkage quantity in a direction perpendicular to the scanning direction (that is, a case in which Expression (2) is established regarding the linear expansion coefficient).

In addition, when a material causing martensitic transformation is used and martensitic transformation occurs during manufacturing or after manufacturing, regarding an expansion rate of the three-dimensional object 73 in the longitudinal direction D, a relationship of either Expression (3) or Expression (4) is established based on the kind of the material or heat treatment conditions.

$$M_{90} > M_{45} > M_0 \quad (3)$$

$$M_{90} < M_{45} < M_0 \quad (4)$$

Here, $M_{90}$ indicates an expansion rate [%] due to martensitic transformation of the three-dimensional object 73 formed by performing scanning with the pattern A, $M_0$ indicates an expansion rate [%] due to martensitic transformation of the three-dimensional object 73 formed by performing scanning with the pattern B, and $M_{45}$ indicates an expansion rate [%] due to martensitic transformation of the three-dimensional object 73 formed by performing scanning with the pattern C. Namely, regarding the expansion quantity due to martensitic transformation of the three-dimensional object 73, based on the kind of the material or the heat treatment conditions, there are a case in which the expansion quantity in a direction parallel to the scanning direction is larger than the expansion quantity in a direction perpendicular to the scanning direction (that is, a case in which Expression (3) is established regarding the expansion rate) and a case in which the expansion quantity in a direction parallel to the scanning direction is smaller than the expansion quantity in a direction perpendicular to the scanning direction (that is, a case in which Expression (4) is established regarding the expansion rate).

In addition, when a material causing age hardening is used and the three-dimensional object 73 is subjected to age hardening by performing age hardening processing after manufacturing, regarding a shrinkage rate of the three-dimensional object 73 in the longitudinal direction D, a relationship of either Expression (5) or Expression (6) is established based on the kind of the material or the heat treatment conditions.

$$H_{90} < H_{45} < H_0 \quad (5)$$

$$H_{90} > H_{45} > H_0 \quad (6)$$

Here, $H_{90}$ indicates a shrinkage rate [%] due to age hardening of the three-dimensional object 73 formed by performing scanning with the pattern A, $H_0$ indicates a shrinkage rate [%] due to age hardening of the three-dimensional object 73 formed by performing scanning with the pattern B, and $H_{45}$ indicates a shrinkage rate [%] due to age hardening of the three-dimensional object 73 formed by performing scanning with the pattern C. Namely, regarding the shrinkage quantity due to age hardening of the three-dimensional object 73, based on the kind of the material or the heat treatment conditions, there are a case in which the shrinkage quantity in a direction parallel to the scanning direction is smaller than the shrinkage quantity in a direction perpendicular to the scanning direction (that is, a case in which Expression (5) is established regarding the shrinkage rate) and a case in which the shrinkage quantity in a direction parallel to the scanning direction is larger than the shrinkage quantity in a direction perpendicular to the scanning direction (that is, a case in which Expression (6) is established regarding the shrinkage rate).

In this manner, in accordance with the scanning direction of the laser beam L or the electron beam, a difference occurs in the expansion quantity or the shrinkage quantity during transformation or age hardening of the solidified layer 83, and the expansion quantity or the shrinkage quantity at the time of simple temperature change accompanying no structure change. In addition, the relationship of magnitude of the expansion quantity or the shrinkage quantity due to variance in the scanning direction changes based on the kind of the material, the irradiation conditions, the presence or absence of heat treatment, or the heat treatment conditions. Based on such a relationship between the scanning direction and the expansion quantity or the shrinkage quantity, the expansion quantity or the shrinkage quantity of each of the portions can be controlled by performing scanning with the laser beam L or the electron beam in different scanning directions for the compressive stress applied part and the compressive stress non-applied part in a three-dimensional object. Consequently, the compressive stress can be applied to a desired portion in a three-dimensional object. In addition to the foregoing exemplary materials, any material can be applied to the disclosure as long as a difference occurs in the expansion quantity or the shrinkage quantity in accordance with the scanning direction.

Regarding a material whose thermal expansion coefficient varies in accordance with the scanning direction and in which expansion or shrinkage occurs because of heat treatment, the relationship between the scanning direction and the magnitude of the expansion quantity or the shrinkage quantity is judged comprehensively in consideration of the expansion quantity or the shrinkage quantity at the time of temperature change and the expansion quantity or the shrinkage quantity at the time of heat treatment. For example, a cobalt-free maraging steel is a material whose thermal expansion coefficient varies in accordance with the scanning direction and is a material in which shrinkage occurs because of age hardening. That is, when heat treatment is performed, the relationship between the scanning direction and the magnitude of the expansion quantity or the shrinkage quantity may be obtained with respect to an ultimate expansion quantity or an ultimate shrinkage quantity after heat treatment.

Next, a method of additive manufacturing of a three-dimensional object performed using the foregoing additive manufacturing apparatus 100 will be described. In the present embodiment, a three-dimensional object internally having a flow channel allowing a fluid to circulate therethrough is produced by additive manufacturing.

The method of additive manufacturing of the present embodiment includes a material layer forming step and a solidifying step. In the material layer forming step, the material layer 82 formed of a metal material is formed in the build region R. In the solidifying step, the solidified layer 83 is formed by irradiating a predetermined irradiation region in the material layer 82 with the laser beam L or the electron beam. The material layer forming step and the solidifying step are repeatedly performed.

Figure 9:
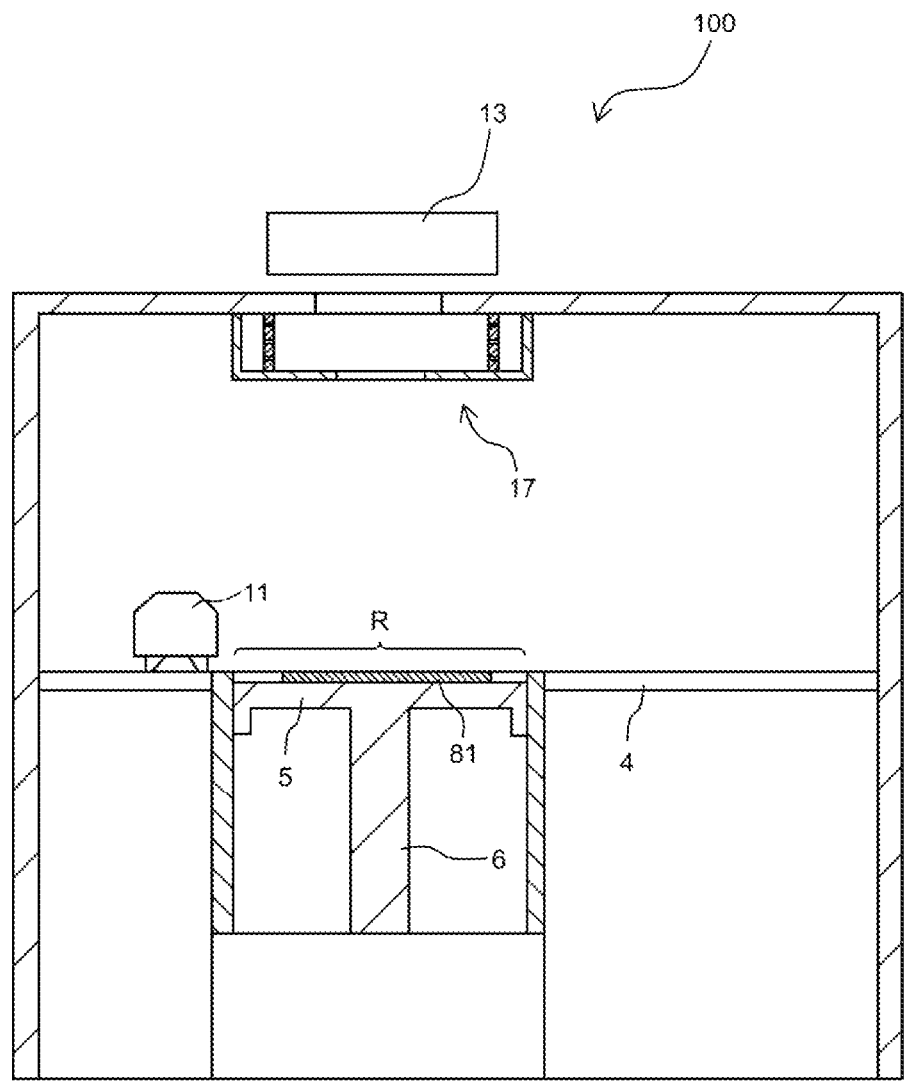
FIG. 9 illustrates a method of producing a three-dimensional object using the additive manufacturing apparatus 100.

First, a first material layer forming step is performed. As illustrated in FIG. 9, a height of the build table 5 is adjusted at an appropriate position in a state in which the base plate 81 is placed on the build table 5. In this state, the recoater head 11 moves from the left side to the right side, and therefore a first material layer 82 is formed on the base plate 81.

Figure 10:
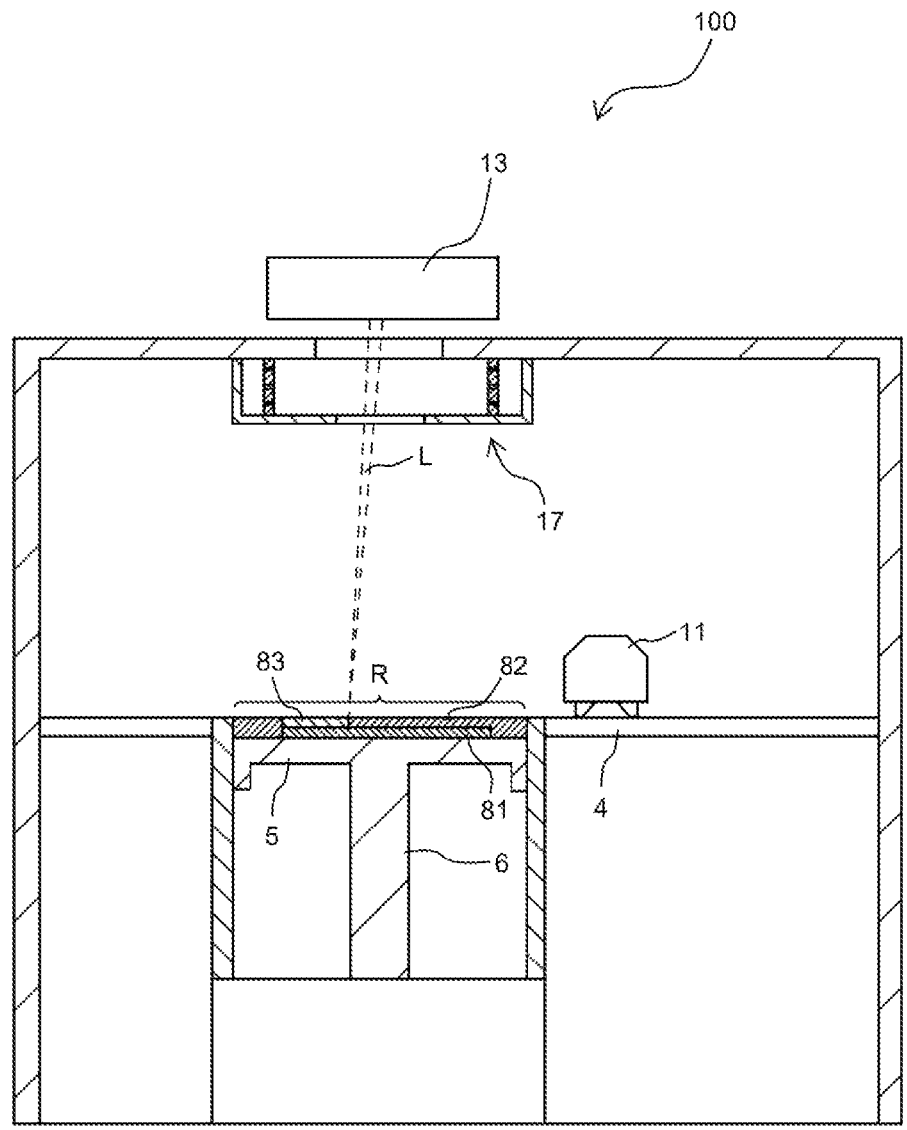
FIG. 10 illustrates the method of producing a three-dimensional object using the additive manufacturing apparatus 100.

Next, a first solidifying step is performed. As illustrated in FIG. 10, a predetermined irradiation region in the first material layer 82 is irradiated with the laser beam L or the electron beam, and the first material layer 82 is solidified, thereby forming a first solidified layer 83.

Subsequently, a second material layer forming step is performed. After the first solidified layer 83 is formed, the height of the build table 5 is lowered by an amount corresponding to one material layer 82. In this state, the recoater head 11 moves from the right side to the left side in the build region R, and therefore a second material layer 82 is formed such that the first solidified layer 83 is covered. Further, a second solidifying step is performed. By a method similar to that described above, a predetermined irradiation region in the second material layer 82 is irradiated with the laser beam L or the electron beam, and the second material layer 82 is solidified, thereby forming a second solidified layer 83.

The material layer forming steps and the solidifying steps are repeated until a desired three-dimensional object is obtained, and thus a plurality of solidified layers 83 is laminated. Adjacent solidified layers 83 are firmly adhere to each other.

One or more solidified layers 83 of the plurality of solidified layers 83 formed in this manner are formed as a stress controlled layer irradiated with the laser beam L or the electron beam such that the compressive stress is applied to a region of a part of the solidified layer(s) 83. The stress controlled layer is constituted to include a compressive stress applied part that is a region to which the compressive stress is applied and a compressive stress non-applied part that is a region different from the compressive stress applied part.

In the solidifying step, scanning of the laser beam L or the electron beam is performed while the scanning direction for the compressive stress applied part is different from the scanning direction for the compressive stress non-applied part such that the compressive stress applied part expands further than the compressive stress non-applied part or the compressive stress non-applied part shrinks compared with the compressive stress applied part based on the relationship between the scanning direction and the expansion quantity or the shrinkage quantity at the time of temperature change or at the time of heat treatment. That is, when the solidified layer 83 is formed by irradiating the material layer 82 formed of a material causing anisotropy in the expansion quantity or the shrinkage quantity in accordance with the scanning direction with the laser beam L or the electron beam, based on the relationship between the scanning direction and the expansion quantity or the shrinkage quantity at the time of temperature change accompanying no structure change or the relationship between the scanning direction and the expansion quantity or the shrinkage quantity at the time of heat treatment accompanying structure change in accordance with the kind of the material, the irradiation conditions, the presence or absence of heat treatment, or the heat treatment conditions which have been researched in advance, scanning of the laser beam L or the electron beam is performed with respect to the compressive stress applied part in the scanning direction in which the expansion quantity increases or the shrinkage quantity decreases compared to the compressive stress non-applied part, and scanning of the laser beam L or the electron beam is performed with respect to the compressive stress non-applied part in the scanning direction in which the expansion quantity decreases or the shrinkage quantity increases compared to the compressive stress applied part. Accordingly, the compressive stress applied part relatively expands with respect to the compressive stress non-applied part. As a result, the compressive stress remains in the compressive stress applied part.

Specifically, the scanning direction in the irradiation region corresponding to each of the compressive stress applied part and the compressive stress non-applied part is determined based on the relationship between the scanning direction and the expansion quantity or the shrinkage quantity of the solidified layer 83 in accordance with the kind of the material, the irradiation conditions, the presence or absence of heat treatment, or the heat treatment conditions. Further, scanning of the laser beam L or the electron beam is performed with respect to the material layer 82 based on the scanning pattern including the scanning direction in each of the irradiation regions. The relationship of magnitude of the expansion quantity or the shrinkage quantity due to variance in the scanning direction may change in accordance with the kind of the material, the irradiation conditions, the presence or absence of heat treatment, or the heat treatment conditions. For this reason, there is a need to ascertain the relationship of magnitude of the expansion quantity or the shrinkage quantity in advance by performing test manufacturing under the same conditions, for example.

Hereinafter, representative examples of scanning patterns in the stress controlled layer will be described. The following exemplary scanning patterns may be combined together in accordance with the shape of the solidified layer 83 or a different scanning pattern may be applied for each solidified layer 83.

Figure 11:
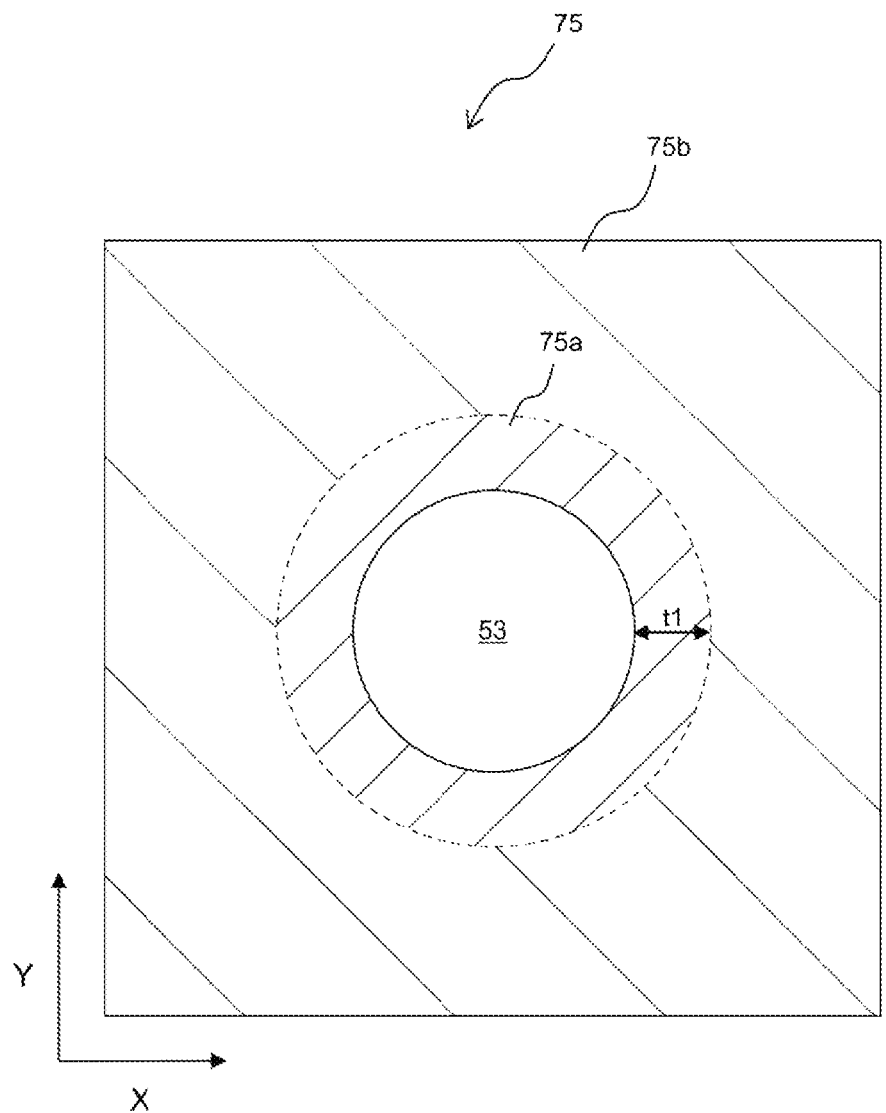
FIG. 11 illustrates an example of a constitution of a stress controlled layer of a three-dimensional object 75.

A three-dimensional object 75 internally has a flow channel 53. FIG. 11 illustrates the solidified layer 83 including a transverse section of the flow channel 53 in the stress controlled layer of the three-dimensional object 75. The transverse section indicates a cross section in a direction perpendicular to a circulation direction of a fluid in the flow channel 53. The circulation direction of a fluid in the flow channel 53 in FIG. 11 is a forward/backward direction.

In the solidified layer 83 illustrated in FIG. 11, an annular portion adjacent to a transverse section of the flow channel 53 and surrounding the transverse section is a compressive stress applied part 75*a*. A different portion, that is, a portion adjacent to the compressive stress applied part 75*a* and surrounding the compressive stress applied part 75*a* is a compressive stress non-applied part 75*b*. A thickness t1 of the compressive stress applied part 75*a* in the solidified layer 83 including the transverse section of the flow channel 53, that is, a distance from a circumferential edge of the transverse section of the flow channel 53 to a contour of the compressive stress applied part 75*a* on the outward side is preferably within a range of 10 µm to 3,000 µm and is more preferably within a range of 50 µm to 1,000 µm. If the thickness t1 of the compressive stress applied part 75*a* in the solidified layer 83 including the transverse section of the flow channel 53 is within this range, the compressive stress can be locally applied to only a necessary portion. In addition, occurrence of cracking in the vicinity of the flow channel 53 can be more reliably curbed.

Figure 12A:
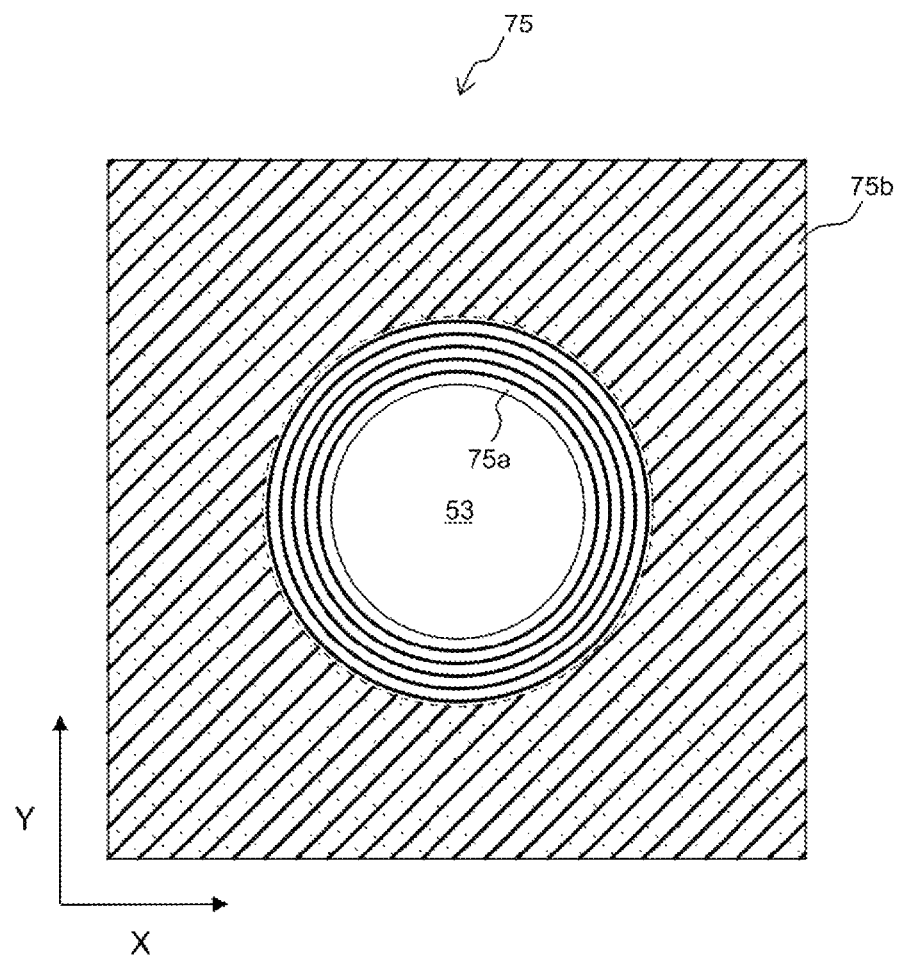
FIG. 12A illustrates an example of a scanning pattern when a solidified layer 83 including a transverse section of a flow channel 53 is formed.
Figure 12B:
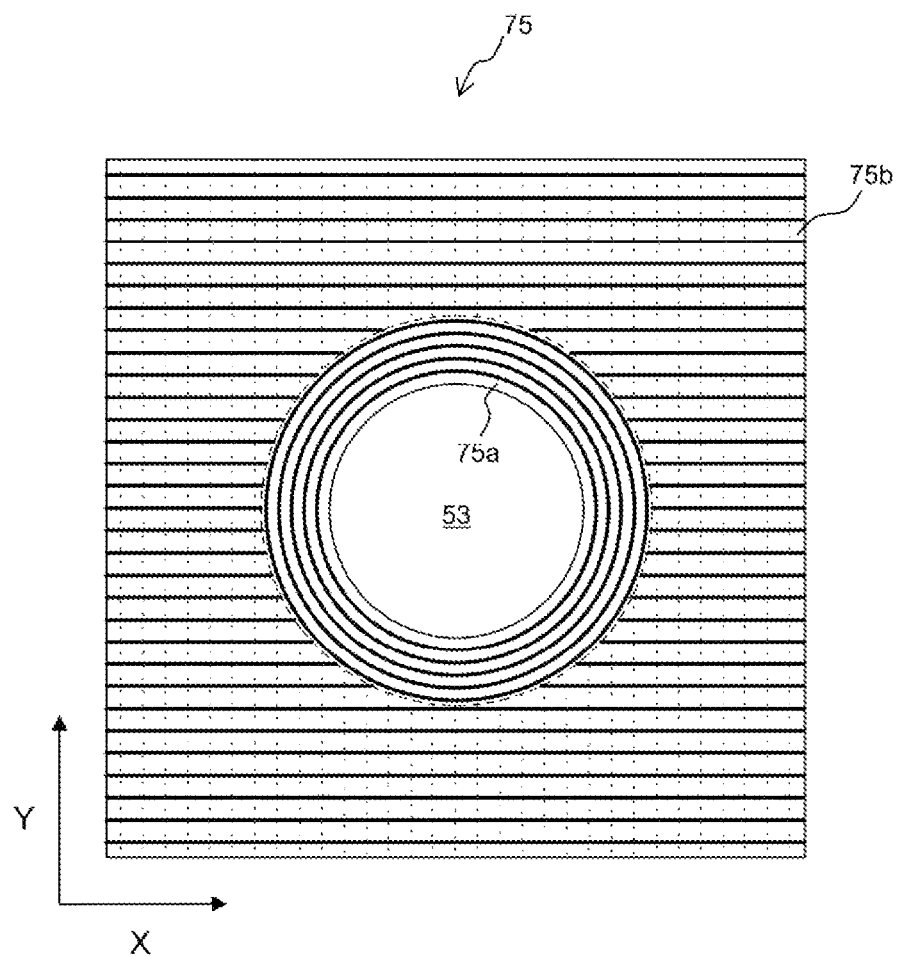
FIG. 12B illustrates another example of a scanning pattern when the solidified layer 83 including a transverse section of the flow channel 53 is formed.

FIGS. 12A and 12B illustrate scanning patterns in the solidified layer 83 of FIG. 11 as examples, when the expansion quantity of the solidified layer 83 in a direction parallel to the scanning direction is larger than the expansion quantity of the solidified layer 83 in a direction perpendicular to the scanning direction or when the shrinkage quantity of the solidified layer 83 in a direction parallel to the scanning direction is smaller than the shrinkage quantity of the solidified layer 83 in a direction perpendicular to the scanning direction. The bold lines in FIGS. 12A and 12B indicate the scanning direction of the laser beam L or the electron beam in the solidified layer 83 illustrated in FIG. 11, and the dotted lines indicate the scanning direction of the laser beam L or the electron beam in upper and lower solidified layers 83 adjacent to the solidified layer 83 illustrated in FIG. 11.

The case in which the expansion quantity of the solidified layer 83 in a direction parallel to the scanning direction is larger than the expansion quantity of the solidified layer 83 in a direction perpendicular to the scanning direction is, for example, a case in which manufacturing is performed using a material causing martensitic transformation and quenching treatment is performed during manufacturing or after manufacturing, and Expression (3) described above is established regarding the expansion rate at the time of martensitic transformation. In addition, the case in which the shrinkage quantity of the solidified layer 83 in a direction parallel to the scanning direction is smaller than the shrinkage quantity of the solidified layer in a direction perpendicular to the scanning direction is, for example, a case in which manufacturing is performed using a material whose thermal expansion coefficient varies in accordance with the scanning direction, and Expression (1) described above is established regarding the linear expansion coefficient of the solidified layer 83; or a case in which age hardening processing is performed after manufacturing using a material causing age hardening, and Expression (5) described above is established regarding the shrinkage rate at the time of age hardening of the solidified layer 83.

In the scanning patterns of FIGS. 12A and 12B, scanning of the laser beam L or the electron beam is performed with respect to the compressive stress applied part 75*a* in the scanning direction parallel to the circumferential edge of the transverse section of the flow channel 53. That is, scanning of the laser beam L or the electron beam is performed with respect to a close edge portion of the transverse section of the flow channel 53 along the annular scanning line surrounding the transverse section. In the scanning pattern of FIG. 12A, raster scanning of the laser beam L or the electron beam is performed with respect to the compressive stress non-applied part 75*b* alternately in the scanning direction at 45° or 135° for each layer of the divided layers. In FIG. 12A, raster scanning in the scanning direction at 45° is indicated by the bold lines, and raster scanning in the scanning direction at 135° is indicated by the dotted lines. In the scanning pattern of FIG. 12B, raster scanning of the laser beam L or the electron beam is performed alternately in the scanning direction at 0° or 90° for each layer of the divided layers. In FIG. 12B, raster scanning in the scanning direction at 0° is indicated by the bold lines, and raster scanning in the scanning direction at 90° is indicated by the dotted lines.

Here, attention should be paid to expansion or shrinkage in a direction parallel to the circumferential edge of the transverse section of the flow channel 53 (hereinafter, a circumferential direction). When scanning of the laser beam L or the electron beam is performed by the scanning pattern of FIG. 12A or 12B, the expansion quantity of the compressive stress applied part 75*a* in the circumferential direction at the time of martensitic transformation becomes larger than the expansion quantity of the compressive stress non-applied part 75*b* in the circumferential direction, or the shrinkage quantity of the compressive stress applied part 75*a* in the circumferential direction at the time of cooling of the solidified layer 83 or at the time of age hardening of the solidified layer 83 becomes smaller than the shrinkage quantity of the compressive stress non-applied part 75*b* in the circumferential direction. Accordingly, the compressive stress applied part 75*a* relatively expands with respect to the compressive stress non-applied part 75*b*, and therefore the compressive stress in the circumferential direction is generated at the circumferential edge of a transverse section of the flow channel 53 in the compressive stress applied part 75*a*. Even if the tensile stress is applied to an inner surface of the flow channel 53 because of circulation of a fluid, at least a part of the tensile stress is reduced by the compressive stress that is the residual stress, and thus cracking is unlikely to occur.

Figure 13:
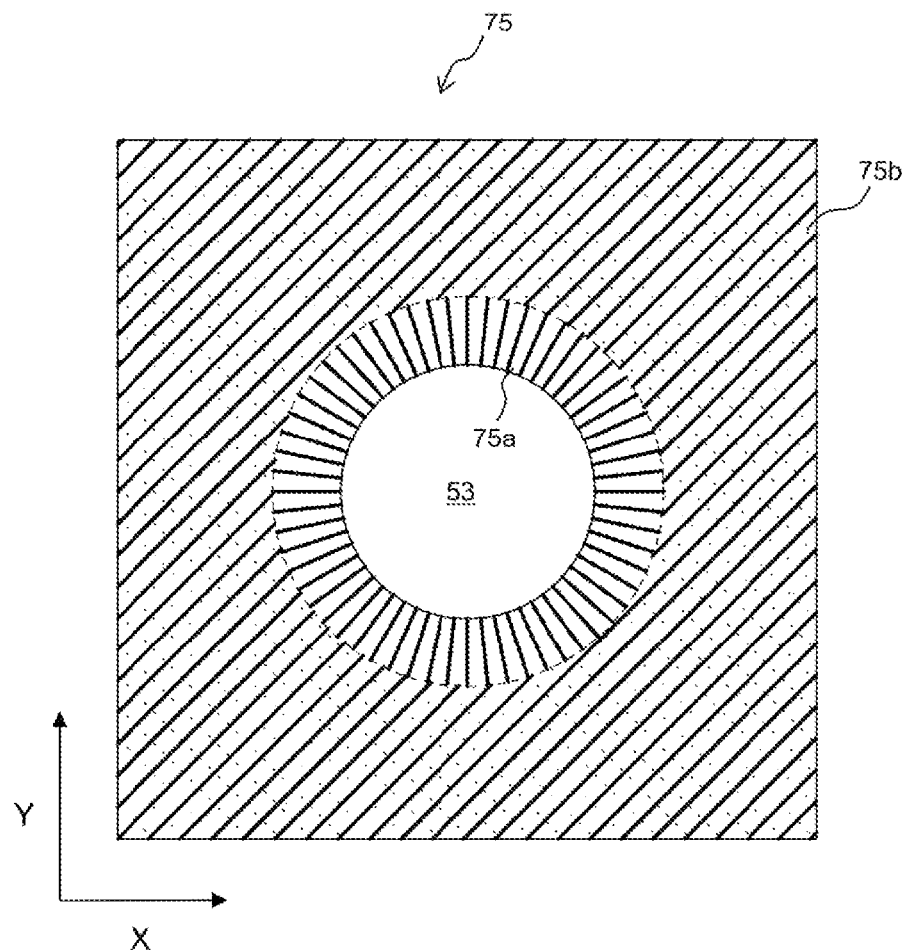
FIG. 13 illustrates another example of a scanning pattern when the solidified layer 83 including a transverse section of the flow channel 53 is formed.

FIG. 13 illustrates a scanning pattern in the solidified layer 83 of FIG. 11 as an example, when the expansion quantity of the solidified layer 83 in a direction parallel to the scanning direction is smaller than the expansion quantity of the solidified layer 83 in a direction perpendicular to the scanning direction or when the shrinkage quantity of the solidified layer 83 in a direction parallel to the scanning direction is larger than the shrinkage quantity of the solidified layer 83 in a direction perpendicular to the scanning direction. The bold lines in FIG. 13 indicate the scanning direction of the laser beam L or the electron beam in the solidified layer 83 illustrated in FIG. 11, and the dotted lines indicate the scanning direction of the laser beam L or the electron beam in the upper and lower solidified layers 83 adjacent to the solidified layer 83 illustrated in FIG. 11. The case in which the expansion quantity of the solidified layer 83 in a direction parallel to the scanning direction is smaller than the expansion quantity of the solidified layer 83 in a direction perpendicular to the scanning direction is, for example, a case in which manufacturing is performed using a material causing martensitic transformation and quenching treatment is performed during manufacturing or after manufacturing, and Expression (4) described above is established regarding the expansion rate at the time of martensitic transformation. In addition, the case in which the shrinkage quantity of the solidified layer 83 in a direction parallel to the scanning direction is larger than the shrinkage quantity of the solidified layer 83 in a direction perpendicular to the scanning direction is, for example, a case in which manufacturing is performed using a material whose thermal expansion coefficient varies in accordance with the scanning direction, and Expression (2) described above is established regarding the linear expansion coefficient of the solidified layer 83; or a case in which age hardening processing is performed after manufacturing using a material causing age hardening, and Expression (6) described above is established regarding the shrinkage rate at the time of age hardening of the solidified layer 83.

In the scanning pattern of FIG. 13, scanning of the laser beam L or the electron beam is performed with respect to the compressive stress applied part 75a in the scanning direction perpendicular to the circumferential edge of the transverse section of the flow channel 53. Raster scanning of the laser beam L or the electron beam is performed with respect to the compressive stress non-applied part 75b alternately in the scanning direction at 45° or 135° for each layer of the divided layers. In FIG. 13, raster scanning in the scanning direction at 45° is indicated by the bold lines, and raster scanning in the scanning direction at 135° is indicated by the dotted lines.

Here, attention should be paid to expansion or shrinkage in the circumferential direction of the transverse section of the flow channel 53. When scanning of the laser beam L or the electron beam is performed by the scanning pattern of FIG. 13, the expansion quantity of the compressive stress applied part 75a in the circumferential direction at the time of martensitic transformation becomes larger than the expansion quantity of the compressive stress non-applied part 75b in the circumferential direction, or the shrinkage quantity of the compressive stress applied part 75a in the circumferential direction at the time of cooling of the solidified layer 83 or at the time of age hardening of the solidified layer 83 becomes smaller than the shrinkage quantity of the compressive stress non-applied part 75b in the circumferential direction. Accordingly, the compressive stress applied part 75a relatively expands with respect to the compressive stress non-applied part 75b, and therefore the compressive stress in the circumferential direction is generated at the circumferential edge of a transverse section of the flow channel 53 in the compressive stress applied part 75a. Even if the tensile stress is applied to the inner surface of the flow channel 53 because of circulation of a fluid, at least a part of the tensile stress is reduced by the compressive stress that is the residual stress, and thus cracking is unlikely to occur.

Figure 14:
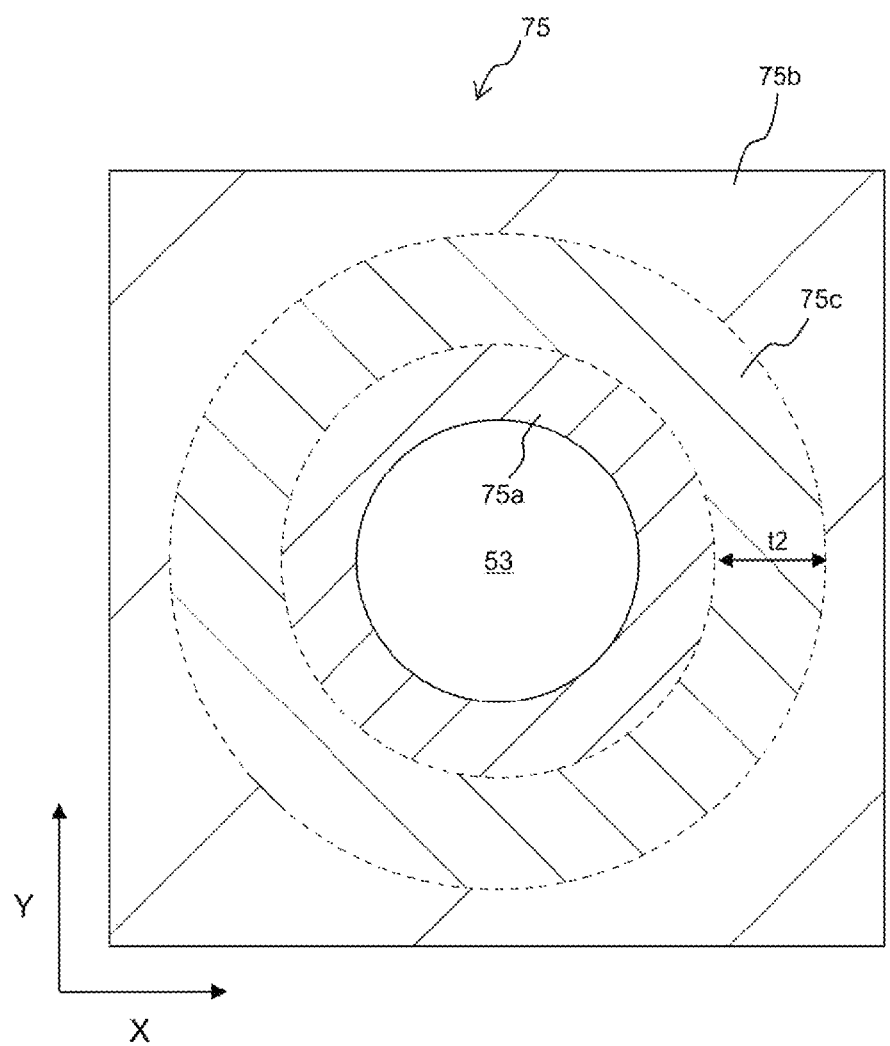
FIG. 14 illustrates another example of a constitution of a stress controlled layer of the three-dimensional object 75.

In another example of a constitution of the stress controlled layer illustrated in FIG. 14, the stress controlled layer further includes an auxiliary part 75c. Specifically, in the solidified layer 83 including the transverse section of the flow channel 53, the annular auxiliary part 75c adjacent to the compressive stress applied part 75a and surrounding the compressive stress applied part 75a is provided between the compressive stress applied part 75a and the compressive stress non-applied part 75b. Scanning of the laser beam L or the electron beam is performed with respect to the auxiliary part 75c such that the expansion quantity becomes smaller than the compressive stress non-applied part 75b or the shrinkage quantity becomes larger than the compressive stress non-applied part 75b based on the relationship between the scanning direction and the expansion quantity or the shrinkage quantity at the time of temperature change or at the time of heat treatment. That is, the auxiliary part 75c is a region having a relatively smaller expansion quantity or a relatively larger shrinkage quantity than the compressive stress non-applied part 75b. In other words, the auxiliary part 75c is an auxiliary region for assisting stress control, and serves as a low expansion part or a high shrinkage part.

Figure 15:
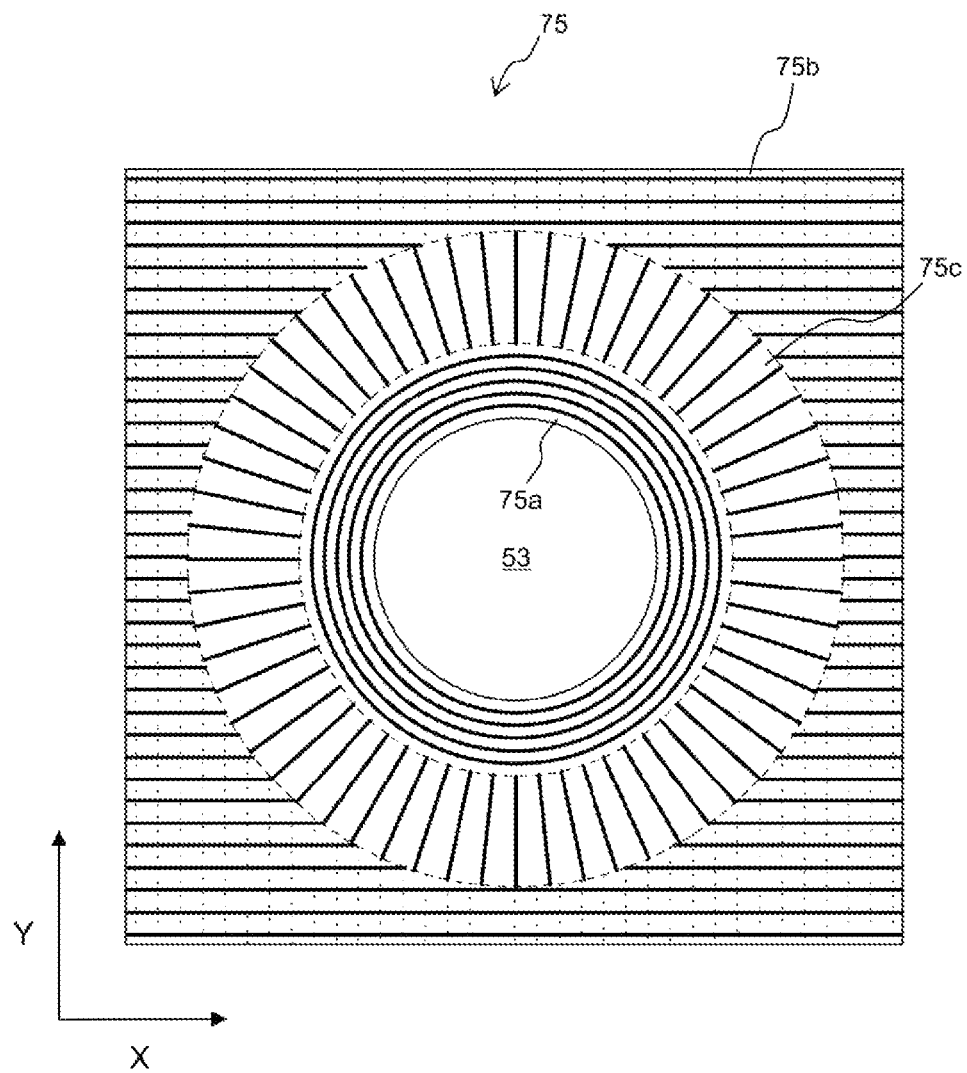
FIG. 15 illustrates another example of a scanning pattern when the solidified layer 83 including a transverse section of the flow channel 53 is formed.

FIG. 15 illustrates a scanning pattern in the solidified layer 83 of FIG. 14 as an example, when the expansion quantity of the solidified layer 83 in a direction parallel to the scanning direction is larger than the expansion quantity of the solidified layer 83 in a direction perpendicular to the scanning direction or when the shrinkage quantity of the solidified layer 83 in a direction parallel to the scanning direction is smaller than the shrinkage quantity of the solidified layer 83 in a direction perpendicular to the scanning direction. The bold lines in FIG. 15 indicate the scanning direction of the laser beam L or the electron beam in the solidified layer 83 illustrated in FIG. 14, and the dotted lines indicate the scanning direction of the laser beam L or the electron beam in the upper and lower solidified layers 83 adjacent to the solidified layer 83 illustrated in FIG. 14.

In the scanning pattern of FIG. 15, scanning of the laser beam L or the electron beam is performed with respect to the compressive stress applied part 75a in the scanning direction parallel to the circumferential edge of the transverse section of the flow channel 53. Scanning of the laser beam L or the electron beam is performed with respect to the auxiliary part 75c in the scanning direction perpendicular to the circumferential edge of the transverse section of the flow channel 53. Raster scanning of the laser beam L or the electron beam is performed with respect to the compressive stress non-applied part 75b alternately in the scanning direction at 0° or 90° for each layer of the divided layers. In FIG. 15, raster scanning in the scanning direction at 0° is indicated by the bold lines, and raster scanning in the scanning direction at 90° is indicated by the dotted lines.

Figure 16:
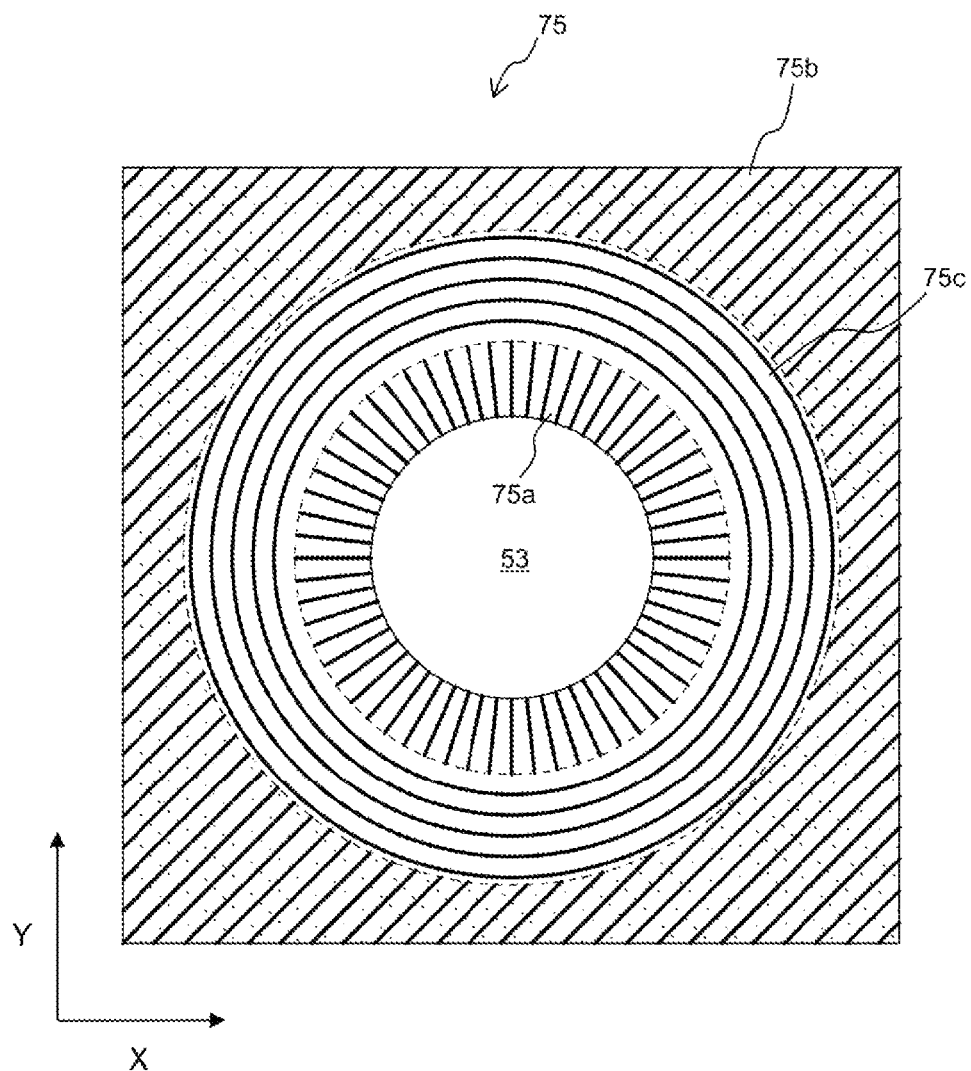
FIG. 16 illustrates another example of a scanning pattern when the solidified layer 83 including a transverse section of the flow channel 53 is formed.

FIG. 16 illustrates a scanning pattern in the solidified layer 83 of FIG. 14 as the example, when the expansion quantity of the solidified layer 83 in a direction parallel to the scanning direction is smaller than the expansion quantity of the solidified layer 83 in a direction perpendicular to the scanning direction or when the shrinkage quantity of the solidified layer 83 in a direction parallel to the scanning direction is larger than the shrinkage quantity of the solidified layer 83 in a direction perpendicular to the scanning direction. The bold lines in FIG. 16 indicate the scanning direction of the laser beam L or the electron beam in the solidified layer 83 illustrated in FIG. 14, and the dotted lines indicate the scanning direction of the laser beam L or the electron beam in the upper and lower solidified layers 83 adjacent to the solidified layer 83 illustrated in FIG. 14.

In the scanning pattern of FIG. 16, scanning of the laser beam L or the electron beam is performed with respect to the compressive stress applied part 75a in the scanning direction perpendicular to the circumferential edge of the transverse section of the flow channel 53. Scanning of the laser beam L or the electron beam is performed with respect to the auxiliary part 75c in the scanning direction parallel to the circumferential edge of the transverse section of the flow channel 53. Raster scanning of the laser beam L or the electron beam is performed with respect to the compressive stress non-applied part 75b alternately in the scanning direction at 45° or 135° for each layer of the divided layers. In FIG. 16, raster scanning in the scanning direction at 45° is indicated by the bold lines, and raster scanning in the scanning direction at 135° is indicated by the dotted lines.

In the scanning pattern of FIG. 15 or 16, scanning of the laser beam L or the electron beam is performed with respect to the compressive stress applied part 75a by a scanning pattern considered to have the largest expansion quantity or the smallest shrinkage quantity, and scanning of the laser beam L or the electron beam is performed with respect to the auxiliary part 75c by a scanning pattern considered to have the smallest expansion quantity or the largest shrinkage quantity. For this reason, when scanning of the laser beam L or the electron beam is performed by the scanning pattern of FIG. 15 or 16, a difference between the expansion quantities or the shrinkage quantities of the compressive stress applied part 75a and a portion adjacent to the compressive stress applied part 75a (here, the auxiliary part 75c) becomes larger than that in the case of the scanning patterns of FIGS. 12A and 12B or FIG. 13. Therefore, a greater compressive stress can be applied to the compressive stress applied part 75a. A thickness t2 of the auxiliary part 75c in the solidified layer 83 including the transverse section of the flow channel 53, that is, a distance from the circumferential edge of the compressive stress applied part 75a to a contour of the auxiliary part 75c on the outward side is preferably within a range of 10 μm to 3,000 μm and is more preferably within a range of 50 μm to 1,000 μm. If the thickness t2 of the auxiliary part 75c in the solidified layer 83 including the transverse section of the flow channel 53 is within this range, the expansion quantity of the portion surrounding the compressive stress applied part 75a can be locally lowered or the shrinkage quantity of the portion surrounding the compressive stress applied part 75a can be locally increased, and thus the sufficient compressive stress can be applied to the compressive stress applied part 75a.

Figure 17:
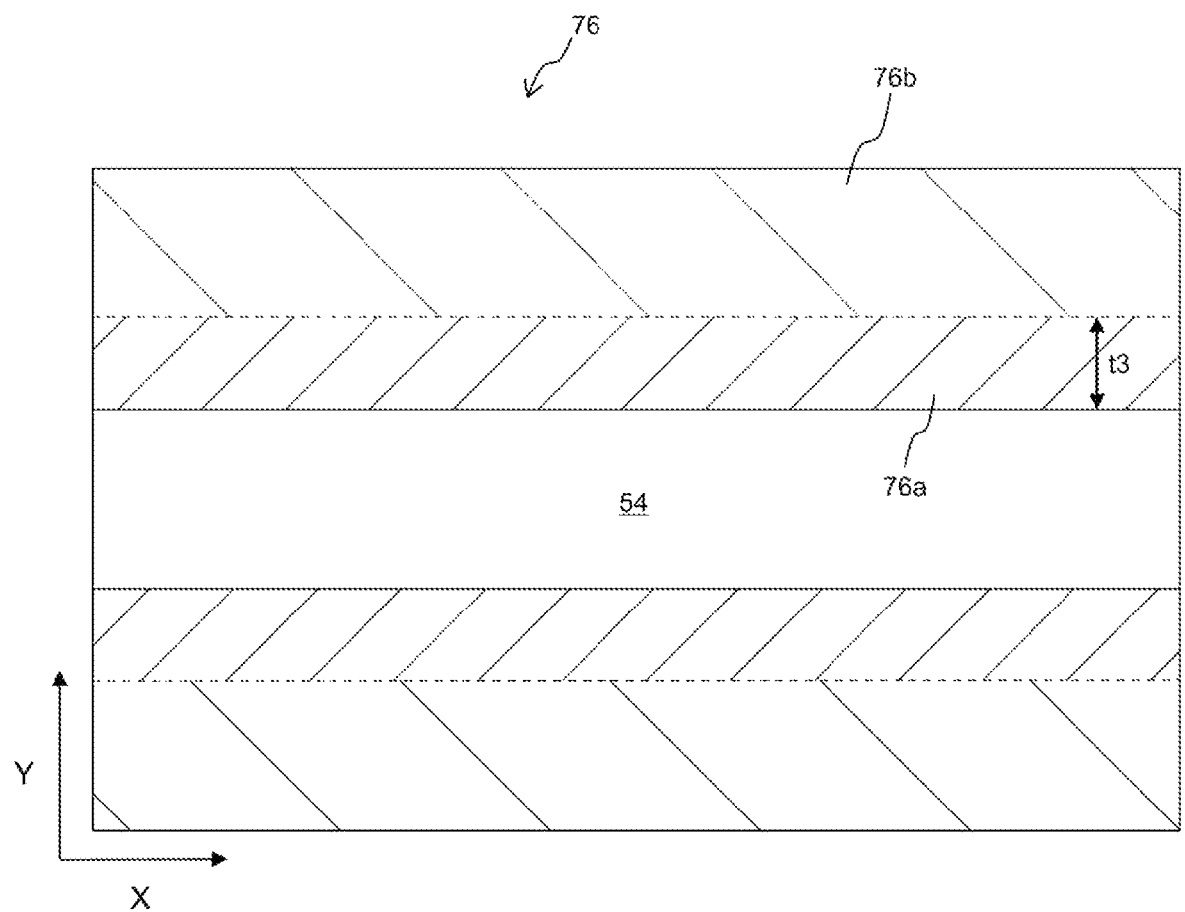
FIG. 17 illustrates an example of a constitution of a stress controlled layer of a three-dimensional object 76.

A three-dimensional object 76 internally has a flow channel 54. FIG. 17 illustrates the solidified layer 83 including a vertical section of the flow channel 54 in the stress controlled layer of the three-dimensional object 76. The vertical section indicates a cross section in a direction parallel to the circulation direction of a fluid in the flow channel 54. The circulation direction of a fluid in the flow channel 54 in FIG. 17 is a lateral direction.

In the solidified layer 83 illustrated in FIG. 17, a portion adjacent to the vertical section of the flow channel 54 is a compressive stress applied part 76a, and a different portion, that is, a portion adjacent to the outward side of the compressive stress applied part 76a is a compressive stress non-applied part 76b. A thickness t3 of the compressive stress applied part 76a in the solidified layer 83 including the vertical section of the flow channel 54, that is, a distance from a circumferential edge of the vertical section of the flow channel 54 to a contour of the compressive stress applied part 76a on the outward side is preferably within a range of 10 μm to 3,000 μm and is more preferably within a range of 50 μm to 1,000 μm. If the thickness t3 of the compressive stress applied part 76a in the solidified layer 83 including the vertical section of the flow channel 54 is within this range, the compressive stress can be locally applied to only a necessary portion. In addition, occurrence of cracking in the vicinity of the flow channel 54 can be more reliably curbed.

Figure 18:
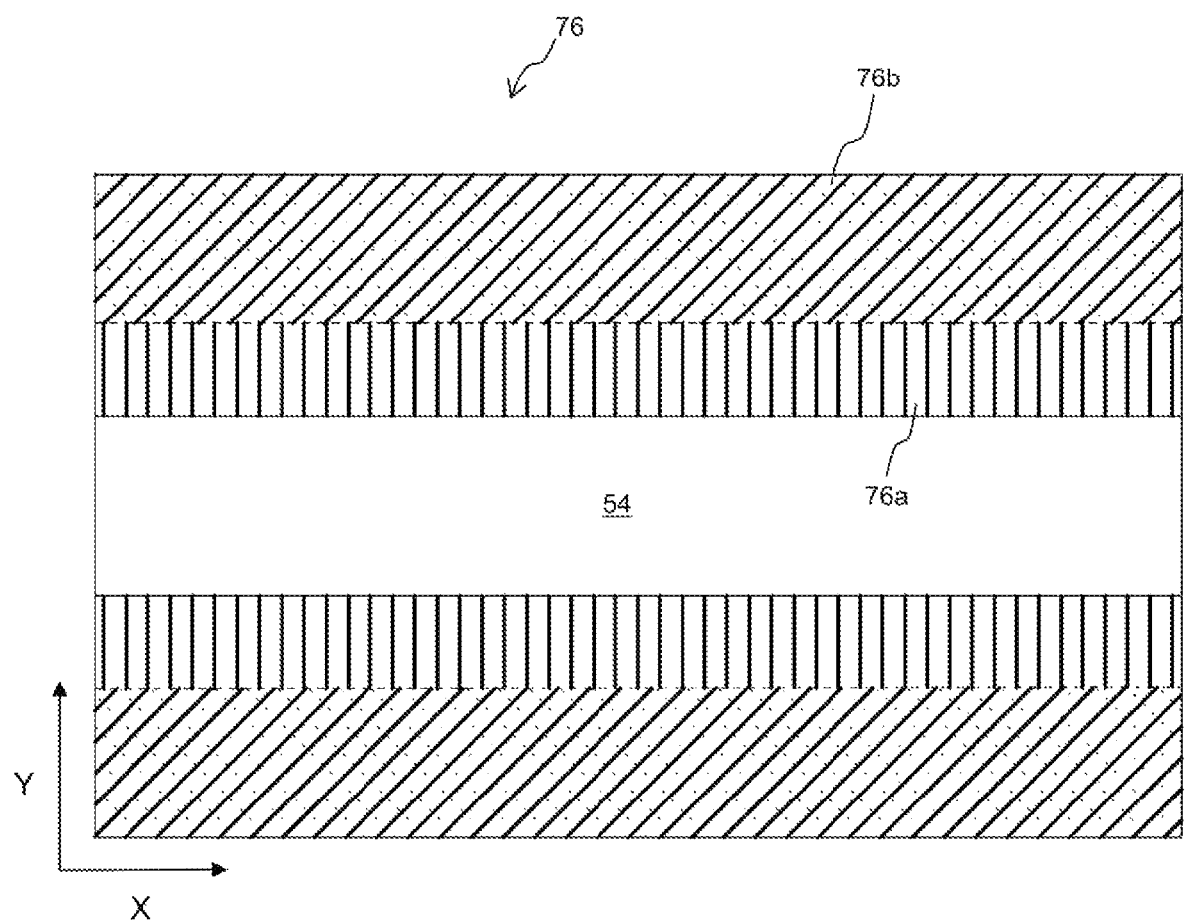
FIG. 18 illustrates an example of a scanning pattern when the solidified layer 83 including a vertical section of a flow channel 54 is formed.

FIG. 18 illustrates a scanning pattern in the solidified layer 83 of FIG. 17 as an example, when the expansion quantity of the solidified layer 83 in a direction parallel to the scanning direction is larger than the expansion quantity of the solidified layer 83 in a direction perpendicular to the scanning direction or when the shrinkage quantity of the solidified layer 83 in a direction parallel to the scanning direction is smaller than the shrinkage quantity of the solidified layer 83 in a direction perpendicular to the scanning direction. The bold lines in FIG. 18 indicate the scanning direction of the laser beam L or the electron beam in the solidified layer 83 illustrated in FIG. 17, and the dotted lines indicate the scanning direction of the laser beam L or the electron beam in the upper and lower solidified layers 83 adjacent to the solidified layer 83 illustrated in FIG. 17.

In the scanning pattern of FIG. 18, scanning of the laser beam L or the electron beam is performed with respect to the compressive stress applied part 76a in the scanning direction perpendicular to the circumferential edge of the vertical section. Raster scanning of the laser beam L or the electron beam is performed with respect to the compressive stress non-applied part 76b alternately in the scanning direction at 45° or 135° for each layer of the divided layers. In FIG. 18, raster scanning in the scanning direction at 45° is indicated by the bold lines, and raster scanning in the scanning direction at 135° is indicated by the dotted lines.

Figure 19:
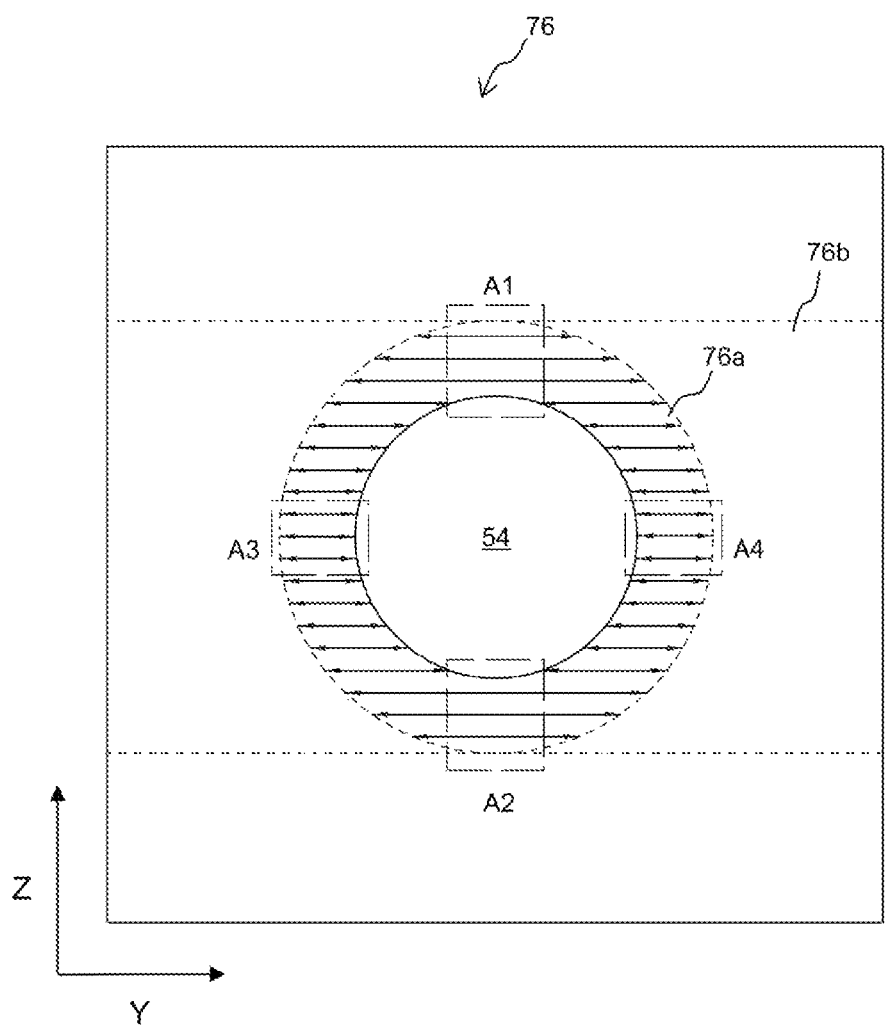
FIG. 19 is a cross-sectional view of the three-dimensional object 76.

FIG. 19 illustrates a cross-sectional view including the transverse section of the flow channel 54 in the three-dimensional object 76 including the stress controlled layer formed and laminated by the scanning pattern of FIG. 18. Both the arrows in FIG. 19 indicate the scanning direction of the laser beam L in the compressive stress applied part 76a of each of the solidified layers 83.

Here, attention should be paid to expansion or shrinkage in a direction parallel to the circumferential edge of a transverse section of the flow channel 54 in regions A1 and A2 positioned on the upper side and the lower side with respect to the flow channel 54 in the compressive stress applied part 76a in the cross-sectional view of FIG. 19, and regions adjacent to the regions A1 and A2 in the compressive stress non-applied part 76b. In the regions A1 and A2 of the compressive stress applied part 76a, the expansion quantity at the time of martensitic transformation becomes larger than the expansion quantity of the compressive stress non-applied part 76b, or the shrinkage quantity at the time of cooling of the solidified layer 83 or at the time of age hardening of the solidified layer 83 becomes smaller than the shrinkage quantity of the compressive stress non-applied part 76*b*. Accordingly, the regions A1 and A2 of the compressive stress applied part 76*a* relatively expands with respect to the compressive stress non-applied part 76*b*, and therefore the compressive stress in a direction substantially parallel to the circumferential edge of the transverse section of the flow channel 54 is generated in the regions A1 and A2 of the compressive stress applied part 76*a*.

Next, attention should be paid to expansion or shrinkage in a direction perpendicular to the circumferential edge of the transverse section of the flow channel 54 in regions A3 and A4 positioned on the left side and the right side with respect to the flow channel 54 in the compressive stress applied part 76*a* in the cross-sectional view of FIG. 19, and regions adjacent to the regions A3 and A4 in the compressive stress non-applied part 76*b*. In the regions A3 and A4 of the compressive stress applied part 76*a*, the expansion quantity at the time of martensitic transformation becomes larger than the expansion quantity of the compressive stress non-applied part 76*b*, or the shrinkage quantity at the time of cooling of the solidified layer 83 or at the time of age hardening of the solidified layer 83 becomes smaller than the shrinkage quantity of the compressive stress non-applied part 76*b*. Accordingly, the regions A3 and A4 of the compressive stress applied part 76*a* relatively expands with respect to the compressive stress non-applied part 76*b*, and therefore the compressive stress is generated in the regions A3 and A4 of the compressive stress applied part 76*a* in a direction substantially perpendicular to the circumferential edge of the transverse section of the flow channel, namely, a direction in which the flow channel 54 is pressurized.

In this manner, when scanning of the laser beam L or the electron beam is performed by the scanning pattern of FIG. 18, the compressive stress in a direction substantially parallel to the circumferential edge of the transverse section of the flow channel 54 remains in the regions A1 and A2 of the compressive stress applied part 76*a*, and the compressive stress in a direction substantially perpendicular to the circumferential edge of a transverse section of the flow channel 54 remains in the regions A3 and A4 of the compressive stress applied part 76*a*. Accordingly, even if the tensile stress is applied to an inner surface of the flow channel 54 because of circulation of a fluid, at least a part of the tensile stress is reduced by the compressive stress that is a residual stress, and thus cracking is unlikely to occur.

Figure 20:
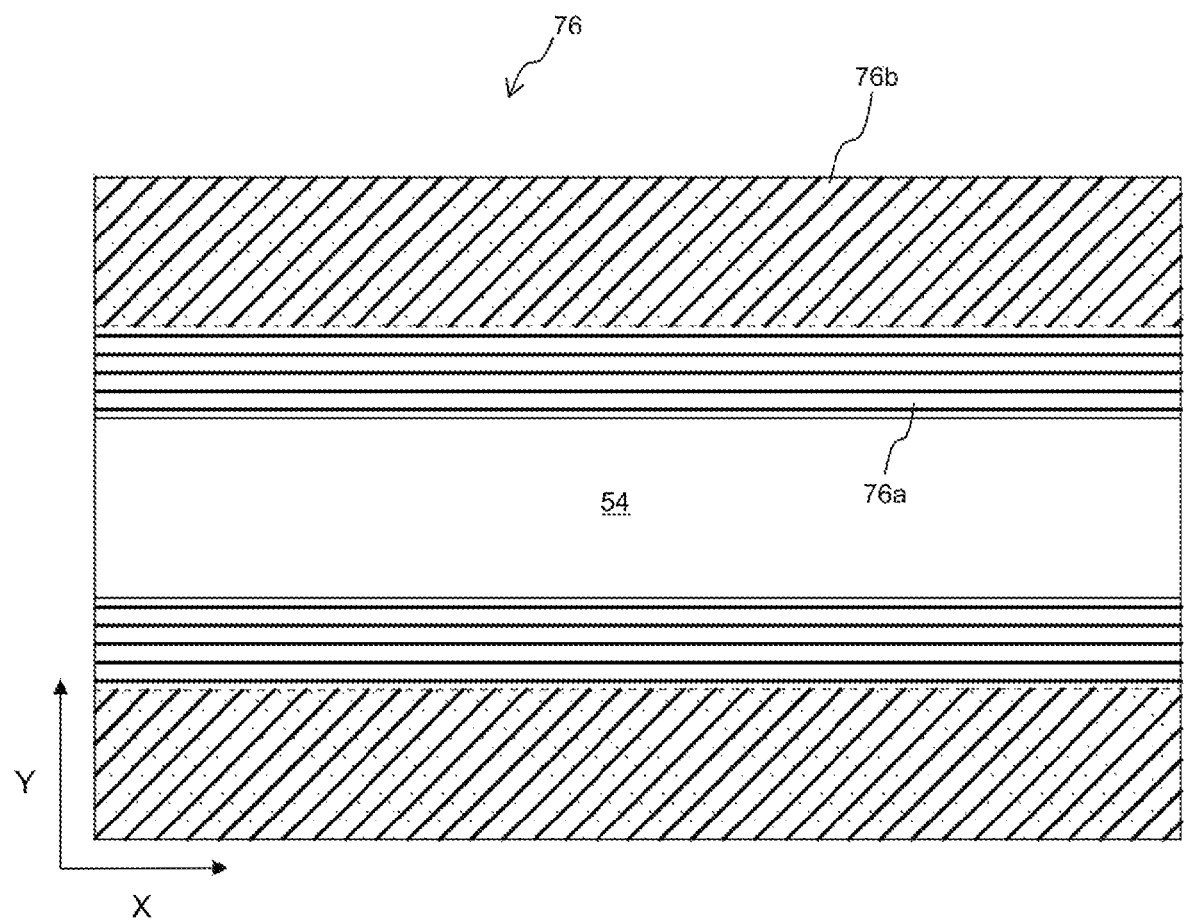
FIG. 20 illustrates another example of a scanning pattern when the solidified layer 83 including a vertical section of the flow channel 54 is formed.

FIG. 20 illustrates a scanning pattern in the solidified layer 83 of FIG. 17 as an example, when the expansion quantity of the solidified layer 83 in a direction parallel to the scanning direction is smaller than the expansion quantity of the solidified layer 83 in a direction perpendicular to the scanning direction or when the shrinkage quantity of the solidified layer 83 in a direction parallel to the scanning direction is larger than the shrinkage quantity of the solidified layer 83 in a direction perpendicular to the scanning direction. The bold lines in FIG. 20 indicate the scanning direction of the laser beam L or the electron beam in the solidified layer 83 illustrated in FIG. 17, and the dotted lines indicate the scanning direction of the laser beam L or the electron beam in the upper and lower solidified layers 83 adjacent to the solidified layer 83 illustrated in FIG. 17.

In the scanning pattern of FIG. 20, scanning of the laser beam L or the electron beam is performed with respect to the compressive stress applied part 76*a* in the scanning direction parallel to the circumferential edge of the vertical section. Raster scanning of the laser beam L or the electron beam is performed with respect to the compressive stress non-applied part 76*b* alternately in the scanning direction at 45° or 135° for each layer of the divided layers. In FIG. 20, raster scanning in the scanning direction at 45° is indicated by the bold lines, and raster scanning in the scanning direction at 135° is indicated by the dotted lines.

Similarly, when scanning of the laser beam L or the electron beam is performed by the scanning pattern of FIG. 20, the compressive stress in a direction substantially parallel to the circumferential edge of the transverse section of the flow channel 54 remains in regions positioned on the upper side and the lower side with respect to the flow channel 54 in the compressive stress applied part 76*a*, and the compressive stress in a direction substantially perpendicular to the circumferential edge of the transverse section of the flow channel 54 remains in regions positioned on the left side and the right side with respect to the flow channel 54 in the compressive stress applied part 76*a*. Accordingly, even if the tensile stress is applied to the inner surface of the flow channel 54 because of circulation of a fluid, at least a part of the tensile stress is reduced by the compressive stress that is a residual stress, and thus cracking is unlikely to occur.

Figure 21:
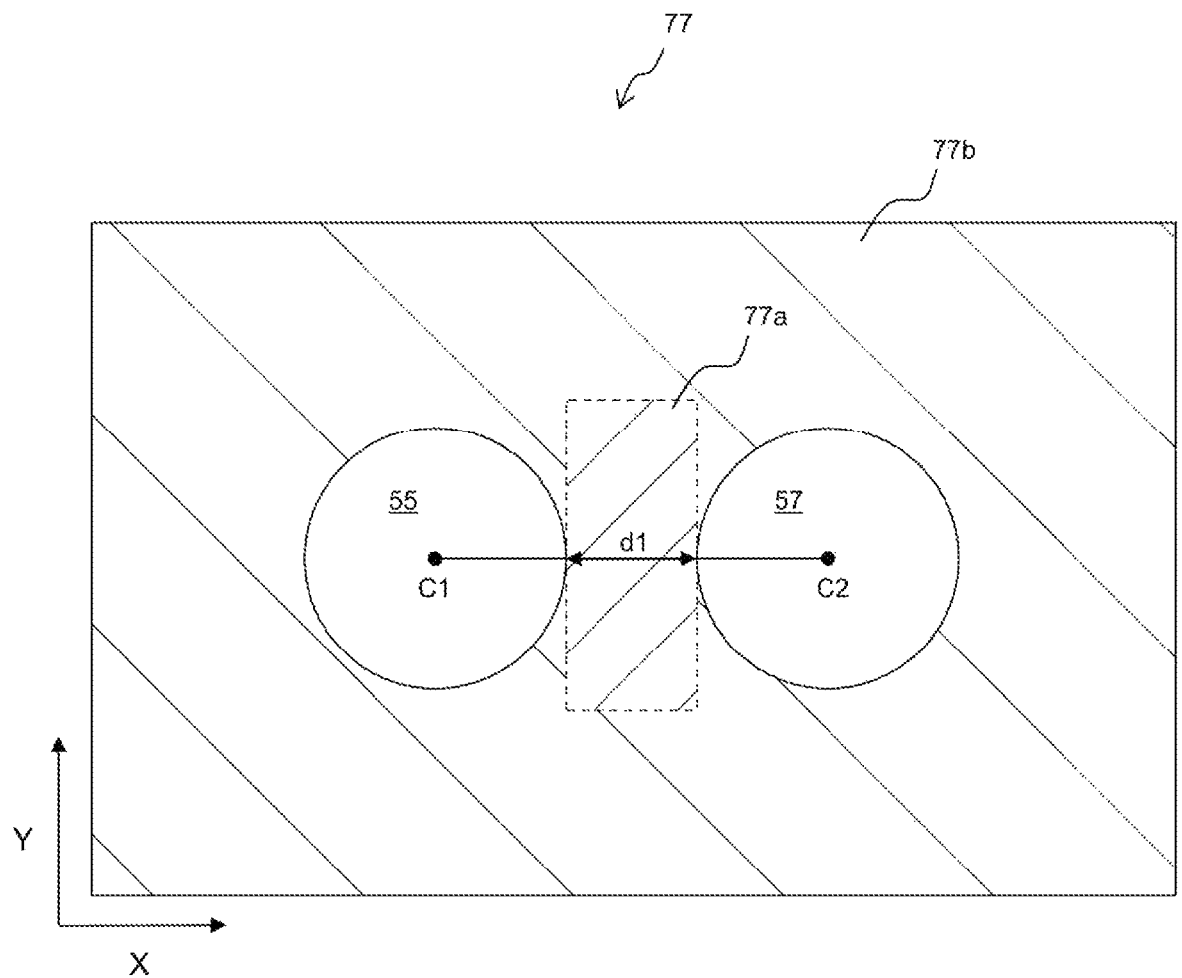
FIG. 21 illustrates an example of a constitution of a stress controlled layer of a three-dimensional object 77.

A three-dimensional object 77 internally has a plurality of flow channels 55 and 57. FIG. 21 illustrates the solidified layer 83 including transverse sections of the two flow channels 55 and 57 in the stress controlled layer of the three-dimensional object 77.

In the solidified layer 83 illustrated in FIG. 21, a portion between transverse sections of the two flow channels 55 and 57 is a compressive stress applied part 77*a*, and a different portion, that is, a portion adjacent to the compressive stress applied part 77*a* is a compressive stress non-applied part 77*b*. In the present embodiment, the compressive stress applied part 77*a* substantially has a rectangular shape. However, for example, both ends of the compressive stress applied part 77*a* may have shapes along the circumferential edges of the flow channels 55 and 57.

Figure 22:
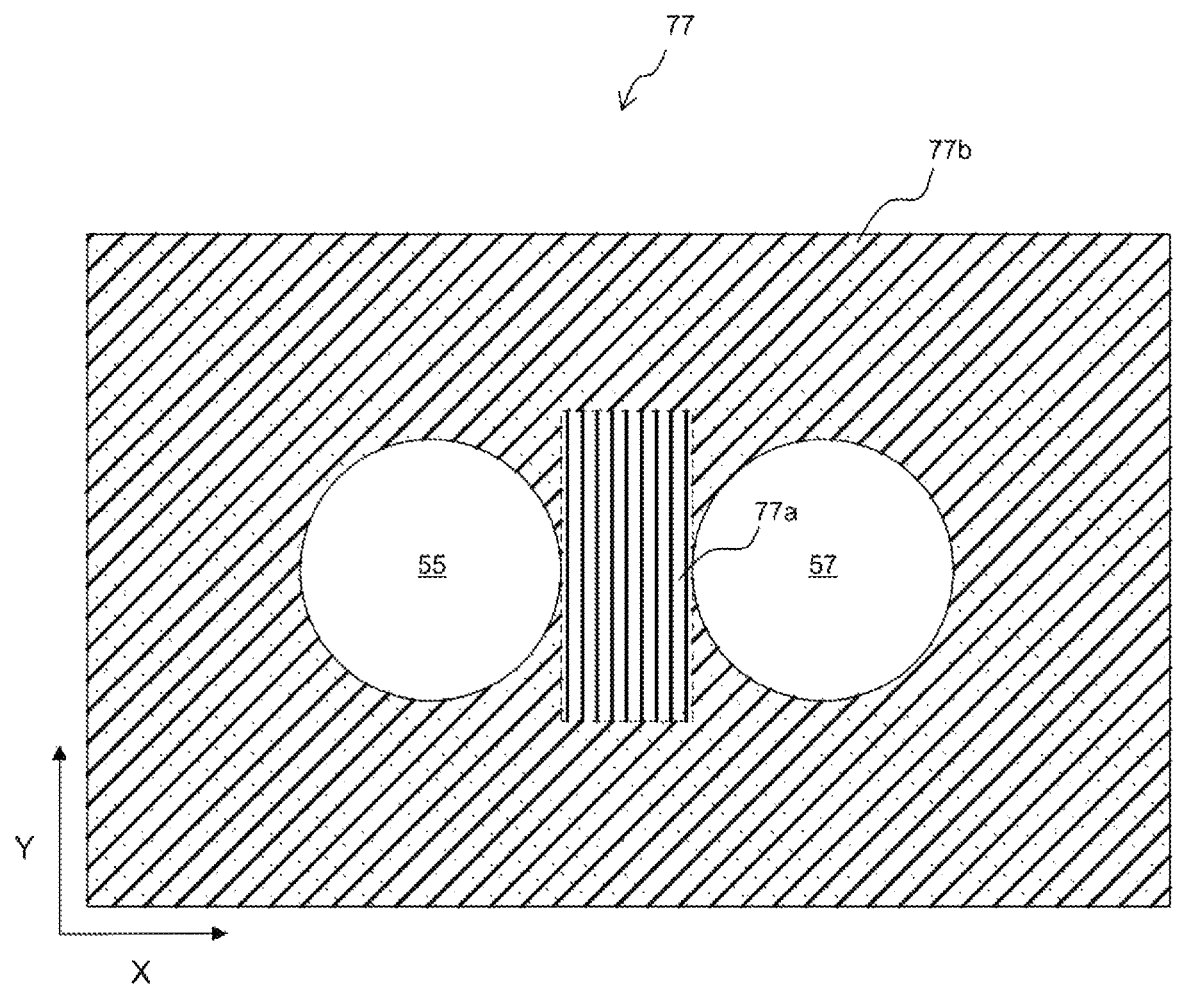
FIG. 22 illustrates an example of a scanning pattern when the solidified layer 83 including transverse sections of flow channels 55 and 57 are formed.

FIG. 22 illustrates a scanning pattern in the solidified layer 83 of FIG. 21 as an example, when the expansion quantity of the solidified layer 83 in a direction parallel to the scanning direction is larger than the expansion quantity of the solidified layer 83 in a direction perpendicular to the scanning direction or when the shrinkage quantity of the solidified layer 83 in a direction parallel to the scanning direction is smaller than the shrinkage quantity of the solidified layer 83 in a direction perpendicular to the scanning direction. The bold lines in FIG. 22 indicate the scanning direction of the laser beam L or the electron beam in the solidified layer 83 illustrated in FIG. 21, and the dotted lines indicate the scanning direction of the laser beam L or the electron beam in the upper and lower solidified layers 83 adjacent to the solidified layer 83 illustrated in FIG. 21.

In the scanning pattern of FIG. 22, scanning of the laser beam L or the electron beam is performed with respect to the compressive stress applied part 77*a* in the scanning direction perpendicular to a segment connecting the two transverse sections to each other, that is, a segment connecting a center C1 of the transverse section of the flow channel 55 and a center C2 of the transverse section of the flow channel 57 in FIG. 21 to each other. Raster scanning of the laser beam L or the electron beam is performed with respect to the compressive stress non-applied part 77*b* alternately in the scanning direction at 45° or 135° for each layer of the divided layers. In FIG. 22, raster scanning in the scanning direction at 45° is indicated by the bold lines, and raster scanning in the scanning direction at 135° is indicated by the dotted lines.

Here, attention should be paid to expansion or shrinkage in the circumferential direction of the transverse sections of the flow channels 55 and 57. When scanning of the laser beam L or the electron beam is performed by the scanning pattern of FIG. 22, the expansion quantity of the compressive stress applied part 77a in the circumferential direction at the time of martensitic transformation becomes larger than the expansion quantity of the compressive stress non-applied part 77b in the circumferential direction, or the shrinkage quantity of the compressive stress applied part 77a in the circumferential direction at the time of cooling of the solidified layer 83 or at the time of age hardening of the solidified layer 83 becomes smaller than the shrinkage quantity of the compressive stress non-applied part 77b in the circumferential direction. Accordingly, the compressive stress applied part 77a relatively expands with respect to the compressive stress non-applied part 77b, and therefore the compressive stress in a direction substantially parallel to the circumferential edges of the transverse sections of the flow channels 55 and 57 is generated in the compressive stress applied part 77a. Since the tensile stress is generated in a portion between the transverse sections of the two flow channels 55 and 57 because of circulation of a fluid in each of the flow channels, cracking is likely to occur. Hence, the compressive stress is applied to a portion between the transverse sections of the two flow channels 55 and 57 so that at least a part of the tensile stress is reduced by the compressive stress that is the residual stress, and thus cracking is unlikely to occur.

Figure 23:
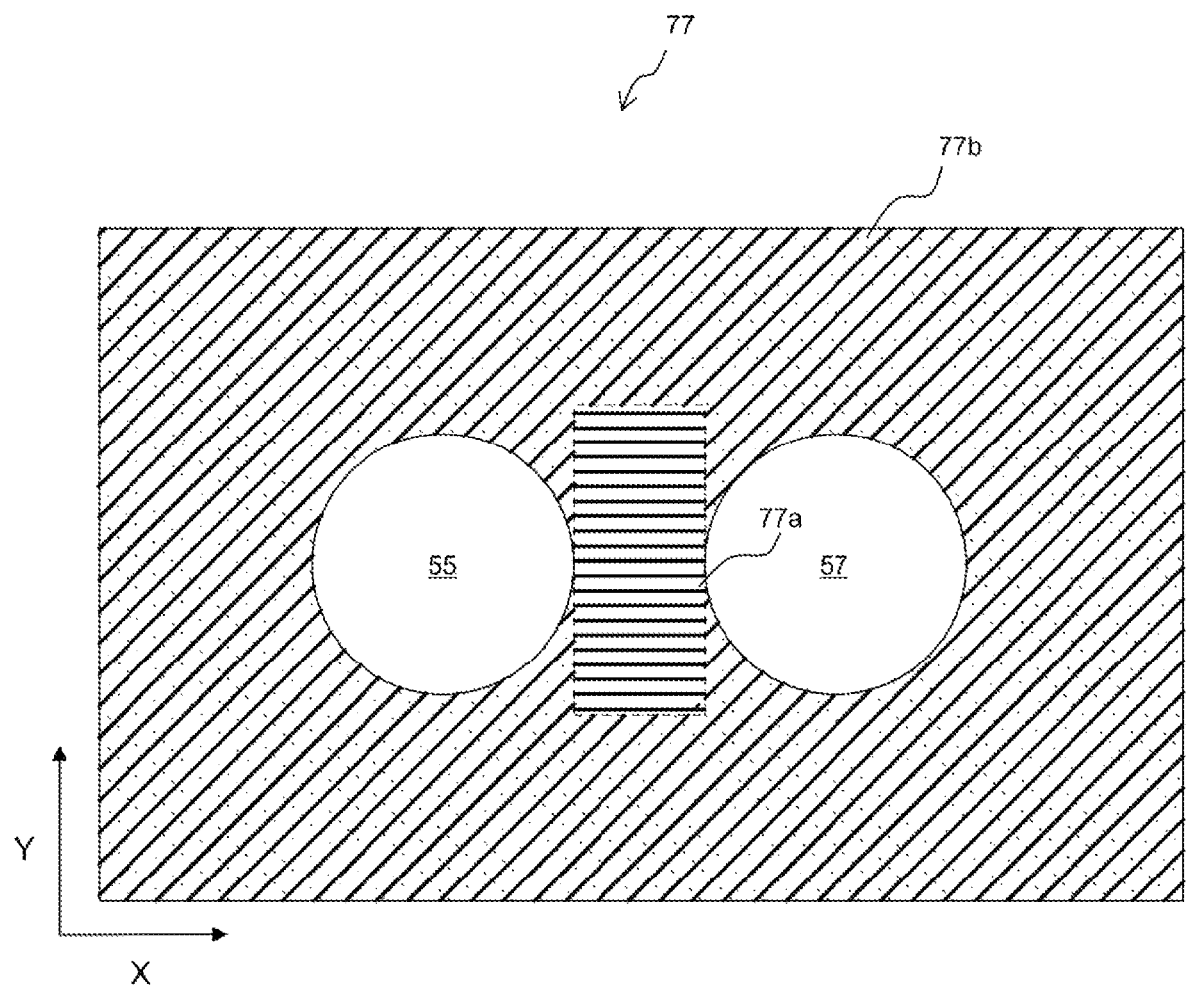
FIG. 23 illustrates another example of a scanning pattern when the solidified layer 83 including transverse sections of the flow channels 55 and 57 are formed.

FIG. 23 illustrates a scanning pattern in the solidified layer 83 of FIG. 21 as an example, when the expansion quantity of the solidified layer 83 in a direction parallel to the scanning direction is smaller than the expansion quantity of the solidified layer 83 in a direction perpendicular to the scanning direction or when the shrinkage quantity of the solidified layer 83 in a direction parallel to the scanning direction is larger than the shrinkage quantity of the solidified layer 83 in a direction perpendicular to the scanning direction. The bold lines in FIG. 23 indicate the scanning direction of the laser beam L or the electron beam in the solidified layer 83 illustrated in FIG. 21, and the dotted lines indicate the scanning direction of the laser beam L or the electron beam in the upper and lower solidified layers 83 adjacent to the solidified layer 83 illustrated in FIG. 21.

In the scanning pattern of FIG. 23, scanning of the laser beam L or the electron beam is performed with respect to the compressive stress applied part 77a in the scanning direction parallel to the segment connecting the two transverse sections to each other. Raster scanning of the laser beam L or the electron beam is performed with respect to the compressive stress non-applied part 77b alternately in the scanning direction at 45° or 135° for each layer of the divided layers. In FIG. 23, raster scanning in the scanning direction at 45° is indicated by the bold lines, and raster scanning in the scanning direction at 135° is indicated by the dotted lines.

Here, attention should be paid to expansion or shrinkage in the circumferential direction of the transverse sections of the flow channels 55 and 57. When scanning of the laser beam L or the electron beam is performed by the scanning pattern of FIG. 23, the expansion quantity of the compressive stress applied part 77a in the circumferential direction at the time of martensitic transformation becomes larger than the expansion quantity of the compressive stress non-applied part 77b in the circumferential direction, or the shrinkage quantity of the compressive stress applied part 77a in the circumferential direction at the time of cooling of the solidified layer 83 or at the time of age hardening of the solidified layer 83 becomes smaller than the shrinkage quantity of the compressive stress non-applied part 77b in the circumferential direction. Accordingly, the compressive stress applied part 77a relatively expands with respect to the compressive stress non-applied part 77b, and therefore the compressive stress in a direction substantially parallel to the circumferential edges of the transverse sections of the flow channels 55 and 57 is generated in the compressive stress applied part 77a. Since the tensile stress is generated in a portion between the transverse sections of the two flow channels 55 and 57 because of circulation of a fluid in each of the flow channels, cracking is likely to occur. Hence, the compressive stress is applied to a portion between the transverse sections of the two flow channels 55 and 57 so that at least a part of the tensile stress is reduced by the compressive stress that is the residual stress, and thus cracking is unlikely to occur.

The scanning patterns of FIGS. 22 and 23 are particularly favorable when the transverse sections of the two flow channels 55 and 57 are relatively close to each other. Specifically, a distance between the transverse sections of the two flow channels 55 and 57, that is, a shortest distance d1 between the circumferential edges of the transverse sections of the two flow channels 55 and 57 in FIG. 21 is three times or smaller than diameters of the flow channels 55 and 57, for example. In addition, in a case in which diameters of transverse sections of two flow channels differ from each other, when the distance between the transverse sections of the two flow channels is three times or smaller than the diameter of that which is relatively larger, it is considered that the transverse sections are relatively close to each other. In addition, in a solidified layer including transverse sections of three or more flow channels relatively close to each other, portions between sets of the transverse sections is the compressive stress applied parts.

In the present embodiment, in the compressive stress applied parts 75a, 76a, and 77a, scanning of the laser beam L or the electron beam has been performed by a scanning pattern estimated to have the largest expansion quantity or a scanning pattern estimated to have the smallest shrinkage quantity. In addition, in the compressive stress non-applied parts 75b, 76b, and 77b, scanning of the laser beam L or the electron beam has been performed by a scanning pattern in which raster scanning in the scanning direction at 0° and raster scanning in the scanning direction at 90° are alternately repeated or a scanning pattern in which raster scanning in the scanning direction at 45° and raster scanning in the scanning direction at 135° are alternately repeated. However, these scanning patterns are merely examples, the scanning pattern in each of the solidified layers 83 of the stress controlled layer need only be a scanning pattern in which scanning of the laser beam L or the electron beam is performed with respect to the compressive stress applied part in a scanning direction different from those of the compressive stress non-applied part and the auxiliary part such that the compressive stress applied part expands further than the compressive stress non-applied part and the auxiliary part, or the compressive stress non-applied part and the auxiliary part shrinks compared with the compressive stress applied part.

Figure 24:
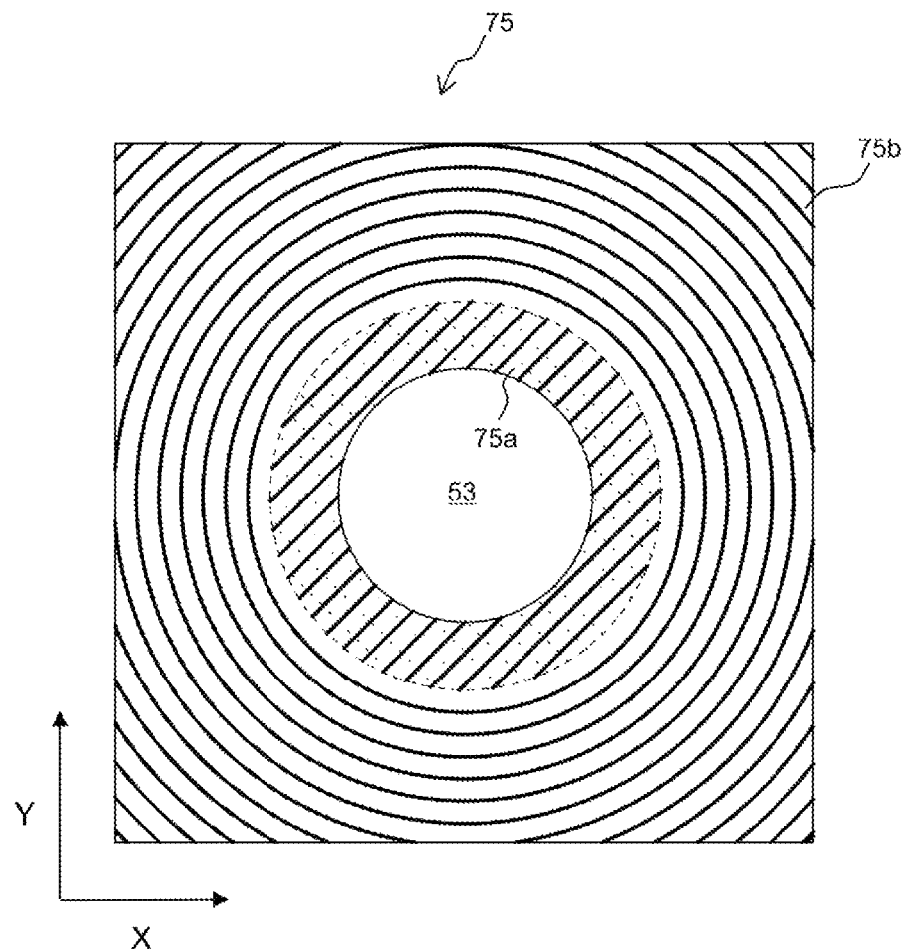
FIG. 24 illustrates another example of a scanning pattern when the solidified layer 83 including a transverse section of the flow channel 53 is formed.

For example, FIG. 24 illustrates a modification example of the scanning pattern in the solidified layer 83 of FIG. 11, when the expansion quantity of the solidified layer 83 in a direction parallel to the scanning direction is smaller than the expansion quantity of the solidified layer 83 in a direction perpendicular to the scanning direction or when the shrinkage quantity of the solidified layer 83 in a direction parallel to the scanning direction is larger than the shrinkage quantity of the solidified layer 83 in a direction perpendicular to the scanning direction. The bold lines in FIG. 24 indicate the scanning direction of the laser beam L or the electron beam in the solidified layer 83 illustrated in FIG. 11, and the dotted lines indicate the scanning direction of the laser beam L or the electron beam in the upper and lower solidified layers 83 adjacent to the solidified layer 83 illustrated in FIG. 11. In the scanning pattern of FIG. 24, raster scanning of the laser beam L or the electron beam is performed with respect to the compressive stress applied part 75a alternately in the scanning direction at 45° or 135° for each layer of the divided layers. Scanning of the laser beam L or the electron beam is performed with respect to the compressive stress non-applied part 75b in the scanning direction parallel to the circumferential edge of the transverse section of the flow channel 53. Even by such a scanning pattern, the compressive stress applied part 75a relatively expands with respect to the compressive stress non-applied part 75b, and therefore the compressive stress in the circumferential direction is generated at the circumferential edge of the transverse section of the flow channel 53 in the compressive stress applied part 75a.

In addition, regarding raster scanning with respect to the compressive stress non-applied part, in the present embodiment, the scanning directions at 0° and 90°, and 45° and 135° have been described as examples, but the scanning directions may be at different angles. In addition, in the present embodiment, the scanning directions are varied by 90° for each layer of the divided layers, but raster scanning may be performed in the same scanning direction for all the divided layers. However, it is desirable that raster scanning be performed with respect to the compressive stress non-applied part such that the scanning directions of the vertically adjacent divided layers differ from each other. For example, raster scanning is performed with respect to the compressive stress non-applied part such that the scanning directions of the vertically adjacent divided layers differ from each other by 90°. Also, regarding the solidified layer 83 which is not the stress controlled layer, similar to the compressive stress non-applied part, it is desirable that raster scanning be performed such that the scanning directions of the vertically adjacent divided layers differ from each other, for example, the scanning directions of the vertically adjacent divided layers differ from each other by 90°. In this way, occurrence of distortion due to bias in the scanning direction is curbed, and thus uniformity of a three-dimensional object in its entirety is favorably maintained.

In addition to those which have been specifically described above, other scanning patterns may be adopted as long as the compressive stress applied part relatively expands with respect to the compressive stress non-applied part, or a plurality of scanning patterns described above may be adopted in a manner of being combined together.

Hereinabove, a favorable embodiment of the disclosure has been described. However, the disclosure is not limited to the embodiment described above, and various design changes can be made within the scope described in the claims. For example, the disclosure can also be performed in accordance with the following aspects.

In the embodiment described above, a three-dimensional object internally having a flow channel allowing a fluid to circulate therethrough is taken as a target. However, an application target for the method of additive manufacturing of the disclosure is not limited thereto. For example, the method of additive manufacturing of the disclosure can also be applied to a three-dimensional object having a notch at an end part.

Figure 25:
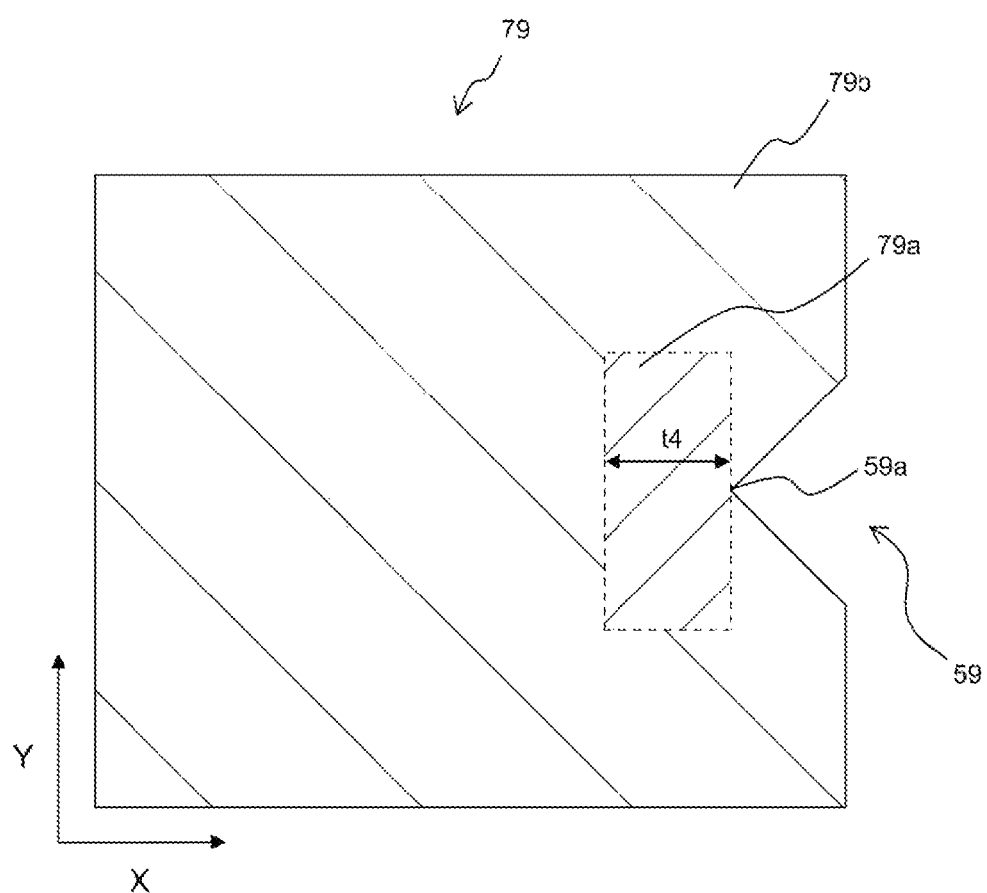
FIG. 25 illustrates an example of a constitution of a stress controlled layer of a three-dimensional object 79.

A three-dimensional object 79 has a notch 59 with a V-shaped cross section at an end part thereof. Here, the deepest part of the notch 59 is referred to as a bottom part 59a, and a direction toward the bottom part 59a from an end surface is referred to as a depth direction. In the three-dimensional object 79, a residual stress at the time of machining or an external stress at a stage of application is likely to be applied to the vicinity of the bottom part 59a of the notch 59, and thus cracking may occur because of such a residual stress and an external stress acting as a tensile stress. Hence, occurrence of cracking can be curbed by applying a compressive stress to the vicinity of the bottom part 59a of the notch 59. FIG. 25 illustrates the solidified layer 83 including a V-shaped cross section of the notch 59 in the stress controlled layer of the three-dimensional object 79.

In the solidified layer 83 illustrated in FIG. 25, a portion adjacent to the bottom part 59a of the notch 59 is a compressive stress applied part 79a, and a different portion, that is, a portion adjacent to the compressive stress applied part 79a is a compressive stress non-applied part 79b. Regarding a thickness t4 of the compressive stress applied part 79a in the depth direction of the notch 59, for example, an appropriate value can be calculated based on a shape of the three-dimensional object 79 in its entirety, a difference between the expansion quantities or the shrinkage quantities of the compressive stress applied part 79a and the compressive stress non-applied part 79b, a Young's modulus of a material, or the like by computer aided engineering (CAE). If the thickness t4 of the compressive stress applied part 79a in the solidified layer 83 including the V-shaped cross section of the notch 59 is within an appropriate range, occurrence of cracking in the bottom part 59a of the notch 59 can be more reliably curbed.

Figure 26:
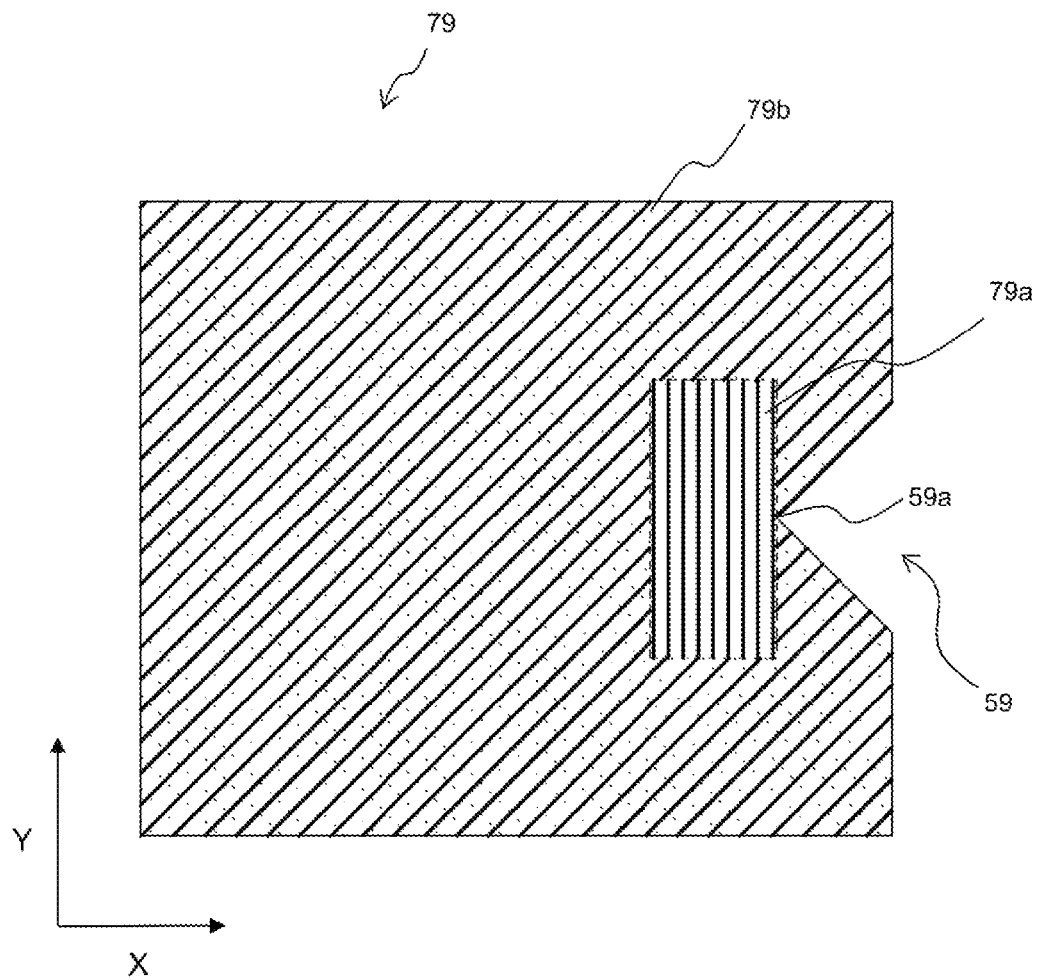
FIG. 26 illustrates an example of a scanning pattern when the solidified layer 83 including a V-shaped cross section of a notch 59 is formed.

FIG. 26 illustrates a scanning pattern in the solidified layer 83 of FIG. 25 as an example, when the expansion quantity of the solidified layer 83 in a direction parallel to the scanning direction is larger than the expansion quantity of the solidified layer 83 in a direction perpendicular to the scanning direction or when the shrinkage quantity of the solidified layer 83 in a direction parallel to the scanning direction is smaller than the shrinkage quantity of the solidified layer 83 in a direction perpendicular to the scanning direction. The bold lines in FIG. 26 indicate the scanning direction of the laser beam L or the electron beam in the solidified layer 83 illustrated in FIG. 25, and the dotted lines indicate the scanning direction of the laser beam L or the electron beam in the upper and lower solidified layers 83 adjacent to the solidified layer 83 illustrated in FIG. 25.

Scanning of the laser beam L or the electron beam is performed with respect to the compressive stress applied part 79a in the scanning direction perpendicular to the depth direction of the notch 59. Raster scanning of the laser beam L or the electron beam is performed with respect to the compressive stress non-applied part 79b alternately in the scanning direction at 45° or 135° for each layer of the divided layers. In FIG. 26, raster scanning in the scanning direction at 45° is indicated by the bold lines, and raster scanning in the scanning direction at 135° is indicated by the dotted lines.

Attention should be paid to expansion or shrinkage in a direction perpendicular to the depth direction in the bottom part 59a of the notch 59 (hereinafter, a perpendicular direction). When scanning of the laser beam L or the electron beam is performed by the scanning pattern of FIG. 26, the expansion quantity of the compressive stress applied part 79a in the perpendicular direction at the time of martensitic transformation becomes larger than the expansion quantity of the compressive stress non-applied part 79*b* in the perpendicular direction, or the shrinkage quantity of the compressive stress applied part 79*a* in the perpendicular direction at the time of cooling of the solidified layer 83 or at the time of age hardening of the solidified layer 83 becomes smaller than the shrinkage quantity of the compressive stress non-applied part 79*b* in the perpendicular direction. Accordingly, the compressive stress applied part 79*a* relatively expands with respect to the compressive stress non-applied part 79*b*, and therefore the compressive stress is generated in the compressive stress applied part 79*a*. Even if the tensile stress is applied to the vicinity of the notch 59, at least a part of the tensile stress is reduced by the compressive stress that is the residual stress, and thus cracking is unlikely to occur.

Figure 27:
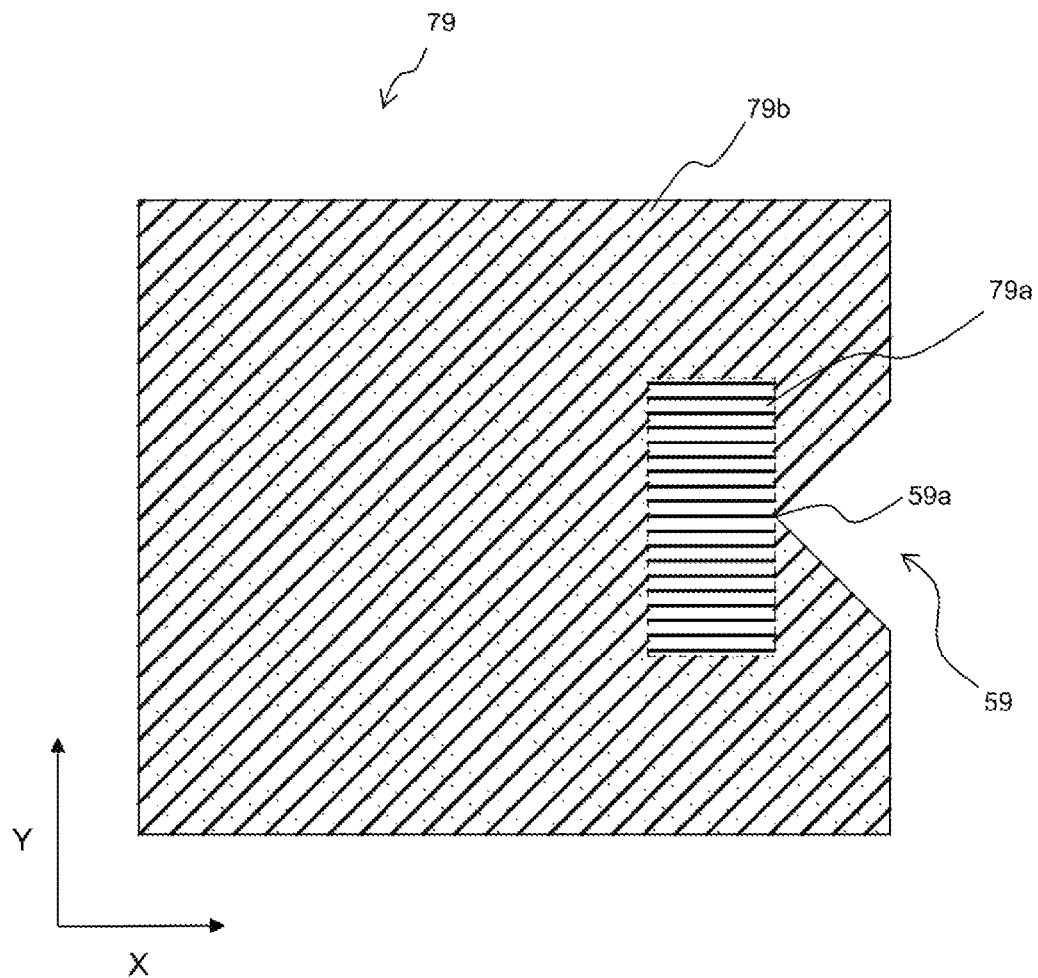
FIG. 27 illustrates an example of a scanning pattern when the solidified layer 83 including a V-shaped cross section of the notch 59 is formed.

FIG. 27 illustrates a scanning pattern in the solidified layer 83 of FIG. 25 as an example, when the expansion quantity of the solidified layer 83 in a direction parallel to the scanning direction is smaller than the expansion quantity of the solidified layer 83 in a direction perpendicular to the scanning direction or when the shrinkage quantity of the solidified layer 83 in a direction parallel to the scanning direction is larger than the shrinkage quantity of the solidified layer 83 in a direction perpendicular to the scanning direction. The bold lines in FIG. 27 indicate the scanning direction of the laser beam L or the electron beam in the solidified layer 83 illustrated in FIG. 25, and the dotted lines indicate the scanning direction of the laser beam L or the electron beam in the upper and lower solidified layers 83 adjacent to the solidified layer 83 illustrated in FIG. 25.

Scanning of the laser beam L or the electron beam is performed with respect to the compressive stress applied part 79*a* in the scanning direction parallel to the depth direction of the notch 59. Raster scanning of the laser beam L or the electron beam is performed with respect to the compressive stress non-applied part 79*b* alternately in the scanning direction at 45° or 135° for each layer of the divided layers. In FIG. 27, raster scanning in the scanning direction at 45° is indicated by the bold lines, and raster scanning in the scanning direction at 135° is indicated by the dotted lines.

Attention should be paid to expansion or shrinkage in the perpendicular direction that is a direction perpendicular to the depth direction in the bottom part 59*a* of the notch 59. When scanning of the laser beam L or the electron beam is performed by the scanning pattern of FIG. 27, the expansion quantity of the compressive stress applied part 79*a* in the perpendicular direction at the time of martensitic transformation becomes larger than the expansion quantity of the compressive stress non-applied part 79*b* in the perpendicular direction, or the shrinkage quantity of the compressive stress applied part 79*a* in the perpendicular direction at the time of cooling of the solidified layer 83 or at the time of age hardening of the solidified layer 83 becomes smaller than the shrinkage quantity of the compressive stress non-applied part 79*b* in the perpendicular direction. Accordingly, the compressive stress applied part 79*a* relatively expands with respect to the compressive stress non-applied part 79*b*, and therefore the compressive stress is generated in the compressive stress applied part 79*a*. Even if the tensile stress is applied to the vicinity of the notch 59, at least a part of the tensile stress is reduced by the compressive stress that is the residual stress, and thus cracking is unlikely to occur.

Other scanning patterns may be employed if they are scanning patterns in which the compressive stress applied part 79*a* relatively expands with respect to the compressive stress non-applied part 79*b* similar to the scanning pattern in the three-dimensional object having the flow channel.

Hereinabove, various embodiments according to the disclosure have been described. However, these have been presented as examples and are not intended to limit the scope of the disclosure. The new embodiments can be performed in various other forms, and various omissions, replacements, and changes can be performed within a range not departing from the gist of the disclosure. The embodiments and deformations thereof are included in the scope and the gist of the disclosure and are included in the disclosure described in the claims and the scope equivalent thereto.

What is claimed is:

1. A method of additive manufacturing comprising:
a material layer forming step of forming a material layer in a build region that is a region for forming a desired three-dimensional object; and
a solidifying step of forming a solidified layer by irradiating an irradiation region of the material layer with a laser beam or an electron beam through scanning performed with the laser beam or the electron beam in a predetermined scanning direction,
wherein the three-dimensional object is produced by laminating a plurality of solidified layers through repetition of the material layer forming step and the solidifying step for each of divided layers formed by dividing the three-dimensional object by a predetermined thickness,
wherein a stress controlled layer, which is one or more solidified layers of the plurality of solidified layers, is constituted to include a compressive stress applied part that is a region to which a compressive stress is applied and a compressive stress non-applied part that is a region different from the compressive stress applied part, and
wherein in the solidifying step, scanning of the laser beam or the electron beam is performed while the scanning direction for the compressive stress applied part is different from the scanning direction for the compressive stress non-applied part such that the compressive stress applied part expands further than the compressive stress non-applied part or the compressive stress non-applied part shrinks compared with the compressive stress applied part based on a relationship between the scanning direction and an expansion quantity or a shrinkage quantity at a time of temperature change or at a time of heat treatment;
wherein an expansion quantity of the solidified layer in a direction parallel to the scanning direction is larger than an expansion quantity of the solidified layer in a direction perpendicular to the scanning direction, or
a shrinkage quantity of the solidified layer in a direction parallel to the scanning direction is smaller than a shrinkage quantity of the solidified layer in a direction perpendicular to the scanning direction.

2. The method of additive manufacturing according to claim 1,
wherein the three-dimensional object has a flow channel allowing a fluid to circulate therethrough.

3. The method of additive manufacturing according to claim 2,
wherein at least one solidified layer of the stress controlled layer includes a transverse section that is a cross section in a direction perpendicular to a circulation direction of the fluid in the flow channel,
wherein the compressive stress applied part of said at least one solidified layer of the stress controlled layer is a portion adjacent to the transverse section and surrounding the transverse section, and wherein in the solidifying step with respect to said at least one solidified layer of the stress controlled layer, scanning of the laser beam or the electron beam is performed such that the scanning direction for the compressive stress applied part is parallel to a circumferential edge of the transverse section.

4. The method of additive manufacturing according to claim 3, wherein said at least one solidified layer of the stress controlled layer further includes an auxiliary part that is a region adjacent to the compressive stress applied part and surrounding the compressive stress applied part, and wherein in the solidifying step with respect to said at least one solidified layer of the stress controlled layer, scanning of the laser beam or the electron beam is performed such that the scanning direction for the auxiliary part is perpendicular to the circumferential edge of the transverse section.

5. The method of additive manufacturing according to claim 2, wherein at least one solidified layer of the stress controlled layer includes a plurality of transverse sections that is cross sections in a direction perpendicular to a circulation direction of the fluid in the flow channel, wherein a distance between at least two transverse sections of the transverse sections is three times or smaller than a diameter of the flow channel, wherein the compressive stress applied part of said at least one solidified layer of the stress controlled layer is a portion between the at least two transverse sections, and wherein in the solidifying step with respect to said at least one solidified layer of the stress controlled layer, scanning of the laser beam or the electron beam is performed such that the scanning direction for the compressive stress applied part is perpendicular to a segment connecting the at least two transverse sections to each other.

6. The method of additive manufacturing according to claim 2, wherein at least one solidified layer of the stress controlled layer includes a vertical section that is a cross section in a direction parallel to a circulation direction of the fluid in the flow channel, wherein the compressive stress applied part of said at least one solidified layer of the stress controlled layer is a portion adjacent to the vertical section, and wherein in the solidifying step with respect to said at least one solidified layer of the stress controlled layer, scanning of the laser beam or the electron beam is performed such that the scanning direction for the compressive stress applied part is perpendicular to a circumferential edge of the vertical section.

7. The method of additive manufacturing according to claim 1, wherein in the solidifying step with respect to the compressive stress non-applied part and a solidified layer that is not the stress controlled layer, raster scanning of the laser beam or the electron beam is performed such that each scanning direction for vertically adjacent divided layers differ.

8. The method of additive manufacturing according to claim 7, wherein in the solidifying step with respect to the compressive stress non-applied part and the solidified layer that is not the stress controlled layer, the raster scanning of the laser beam or the electron beam is performed such that each scanning direction for the vertically adjacent divided layers differ by 90°.

9. The method of additive manufacturing according to claim 1, wherein the three-dimensional object is a mold component constituting at least a part of a mold.

10. A method of additive manufacturing comprising:

a material layer forming step of forming a material layer in a build region that is a region for forming a desired three-dimensional object; and a solidifying step of forming a solidified layer by irradiating an irradiation region of the material layer with a laser beam or an electron beam through scanning performed with the laser beam or the electron beam in a predetermined scanning direction, wherein the three-dimensional object is produced by laminating a plurality of solidified layers through repetition of the material layer forming step and the solidifying step for each of divided layers formed by dividing the three-dimensional object by a predetermined thickness, wherein a stress controlled layer, which is one or more solidified layers of the plurality of solidified layers, is constituted to include a compressive stress applied part that is a region to which a compressive stress is applied and a compressive stress non-applied part that is a region different from the compressive stress applied part, and wherein in the solidifying step, scanning of the laser beam or the electron beam is performed while the scanning direction for the compressive stress applied part is different from the scanning direction for the compressive stress non-applied part such that the compressive stress applied part expands further than the compressive stress non-applied part or the compressive stress non-applied part shrinks compared with the compressive stress applied part based on a relationship between the scanning direction and an expansion quantity or a shrinkage quantity at a time of temperature change or at a time of heat treatment;

wherein an expansion quantity of the solidified layer in a direction parallel to the scanning direction is smaller than an expansion quantity of the solidified layer in a direction perpendicular to the scanning direction, or a shrinkage quantity of the solidified layer in a direction parallel to the scanning direction is larger than a shrinkage quantity of the solidified layer in a direction perpendicular to the scanning direction.

11. The method of additive manufacturing according to claim 10, wherein the three-dimensional object has a flow channel allowing a fluid to circulate therethrough.

12. The method of additive manufacturing according to claim 11, wherein at least one solidified layer of the stress controlled layer includes a transverse section that is a cross section in a direction perpendicular to a circulation direction of the fluid in the flow channel, wherein the compressive stress applied part of said at least one solidified layer of the stress controlled layer is a portion adjacent to the transverse section and surrounding the transverse section, and wherein in the solidifying step with respect to said at least one solidified layer of the stress controlled layer, scanning of the laser beam or the electron beam is performed such that the scanning direction for the compressive stress applied part is perpendicular to a circumferential edge of the transverse section.

13. The method of additive manufacturing according to claim 12,
wherein said at least one solidified layer of the stress controlled layer further includes an auxiliary part that is a region adjacent to the compressive stress applied part and surrounding the compressive stress applied part, and
wherein in the solidifying step with respect to said at least one solidified layer of the stress controlled layer, scanning of the laser beam or the electron beam is performed with such that the scanning direction for the auxiliary part is parallel to the circumferential edge of the transverse section.

14. The method of additive manufacturing according to claim 11,
wherein at least one solidified layer of the stress controlled layer includes a plurality of transverse sections that is cross sections in a direction perpendicular to a circulation direction of the fluid in the flow channel,
wherein a distance between at least two transverse sections of the transverse sections is three times or smaller than a diameter of the flow channel,
wherein the compressive stress applied part of said at least one solidified layer of the stress controlled layer is a portion between the at least two transverse sections, and
wherein in the solidifying step with respect to said at least one solidified layer of the stress controlled layer, scanning of the laser beam or the electron beam is performed such that the scanning direction for the compressive stress applied part is parallel to a segment connecting the at least two transverse sections to each other.

15. The method of additive manufacturing according to claim 11,
wherein at least one solidified layer of the stress controlled layer includes a vertical section that is a cross section in a direction parallel to a circulation direction of the fluid in the flow channel,
wherein the compressive stress applied part of said at least one solidified layer of the stress controlled layer is a portion adjacent to the vertical section, and
wherein in the solidifying step with respect to said at least one solidified layer of the stress controlled layer, scanning of the laser beam or the electron beam is performed such that the scanning direction for the compressive stress applied part is parallel to a circumferential edge of the vertical section.

16. The method of additive manufacturing according to claim 10,
wherein in the solidifying step with respect to the compressive stress non-applied part and a solidified layer that is not the stress controlled layer, raster scanning of the laser beam or the electron beam is performed such that each scanning direction for vertically adjacent divided layers differ.

17. The method of additive manufacturing according to claim 10,
wherein in the solidifying step with respect to the compressive stress non-applied part and the solidified layer that is not the stress controlled layer, the raster scanning of the laser beam or the electron beam is performed such that each scanning direction for the vertically adjacent divided layers differ by 90°.

18. The method of additive manufacturing according to claim 10,
wherein the three-dimensional object is a mold component constituting at least a part of a mold.

* * * * *